US009254477B2

(12) United States Patent
Naritsuka et al.

(10) Patent No.: US 9,254,477 B2
(45) Date of Patent: Feb. 9, 2016

(54) METHOD FOR PRODUCING CATALYTIC METAL LAYER AND METHOD FOR PRODUCING GRAPHENE MATERIAL

(71) Applicant: MEIJO UNIVERSITY, Nagoya (JP)

(72) Inventors: Shigeya Naritsuka, Nagoya (JP); Takahiro Maruyama, Nagoya (JP)

(73) Assignee: Meijo University, Nagoya-Shi (JP)

( * ) Notice: Subject to any disclaimer, the term of this patent is extended or adjusted under 35 U.S.C. 154(b) by 0 days.

(21) Appl. No.: 14/468,663

(22) Filed: Aug. 26, 2014

(65) Prior Publication Data

US 2014/0363363 A1 Dec. 11, 2014

Related U.S. Application Data

(63) Continuation of application No. PCT/JP2013/054762, filed on Feb. 25, 2013.

(30) Foreign Application Priority Data

Feb. 27, 2012 (JP) .................................. 2012-040554

(51) Int. Cl.
*B01J 23/755* (2006.01)
*C01B 31/04* (2006.01)
(Continued)

(52) U.S. Cl.
CPC .............. *B01J 23/755* (2013.01); *B01J 35/002* (2013.01); *B01J 37/08* (2013.01); *B82Y 30/00* (2013.01); *B82Y 40/00* (2013.01); *C01B 31/0453* (2013.01)

(58) Field of Classification Search
CPC ........ B01J 37/08; B01J 23/755; B01J 35/002; B82Y 40/00; B82Y 30/00; C01B 31/0453; C01B 31/04; C01B 31/0407; C01B 31/0415; C01B 2204/00; C01B 2204/02; C01B 2204/04; C01B 2204/06; C01B 2204/065; C01B 2204/20; C01B 2204/22
USPC ................................... 423/448; 502/300, 335
See application file for complete search history.

(56) References Cited

U.S. PATENT DOCUMENTS

| 2009/0155561 A1* | 6/2009 | Choi | B82Y 30/00 428/220 |
| 2010/0021708 A1* | 1/2010 | Kong | B82Y 30/00 428/220 |

FOREIGN PATENT DOCUMENTS

| JP | 2009-164432 A1 | 7/2009 |
| JP | 2010-275168 A1 | 12/2010 |

(Continued)

OTHER PUBLICATIONS

Obraztsov, et al., Chemical vapor deposition of thin graphite films of nanometer thickness, Carbon 2007; 45: 2017-2021.*

(Continued)

*Primary Examiner* — Daniel C McCracken
(74) *Attorney, Agent, or Firm* — Burr & Brown, PLLC

(57) ABSTRACT

A rectangular substrate 12 composed of c-plane sapphire is prepared. Nickel serving as a catalytic metal is deposited on the entirety of an upper surface of the substrate 12 to form a catalytic metal film 14 (see (a)). The catalytic metal film 14 is patterned by a lithography method into a catalytic metal film 16 having a predetermined shape (see (b)). The temperature of the catalytic metal film 16 is raised to 1000° C. and maintained at 1000° C. for 20 minutes. The temperature of the catalytic metal film 16 is lowered from 1000° C. to 800° C. at a rate of 5° C./min. The temperature of the catalytic metal film 16 is maintained at 800° C. for 15 hours. Thereby, a catalytic metal layer 17 having large grains is provided (see (c)).

18 Claims, 17 Drawing Sheets

(51) Int. Cl.
*B01J 37/08* (2006.01)
*B01J 35/00* (2006.01)
*B82Y 30/00* (2011.01)
*B82Y 40/00* (2011.01)

(56) References Cited

FOREIGN PATENT DOCUMENTS

JP 2011-178644 A1 9/2011
JP 2012-020903 A1 2/2012
WO 2012/086641 A1 6/2012

OTHER PUBLICATIONS

International Search Report and Written Opinion (Application No. PCT/JP2013/054762) dated May 28, 2013.

International Preliminary Report on Patentability (Application No. PCT/JP2013/054762) dated Sep. 2, 2014.

* cited by examiner

Fig. 2
(a)
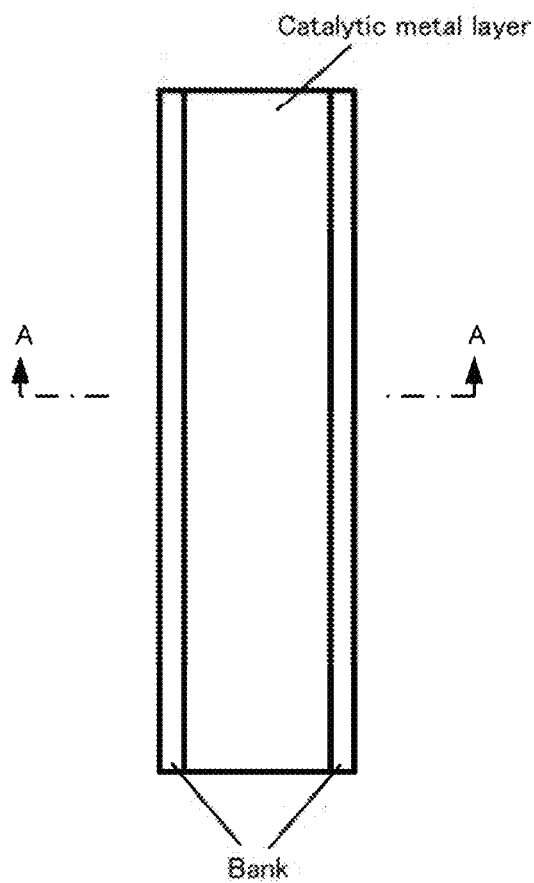
(b)
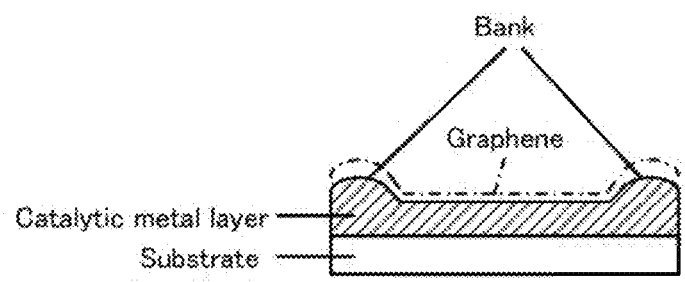

Fig. 3
(a)
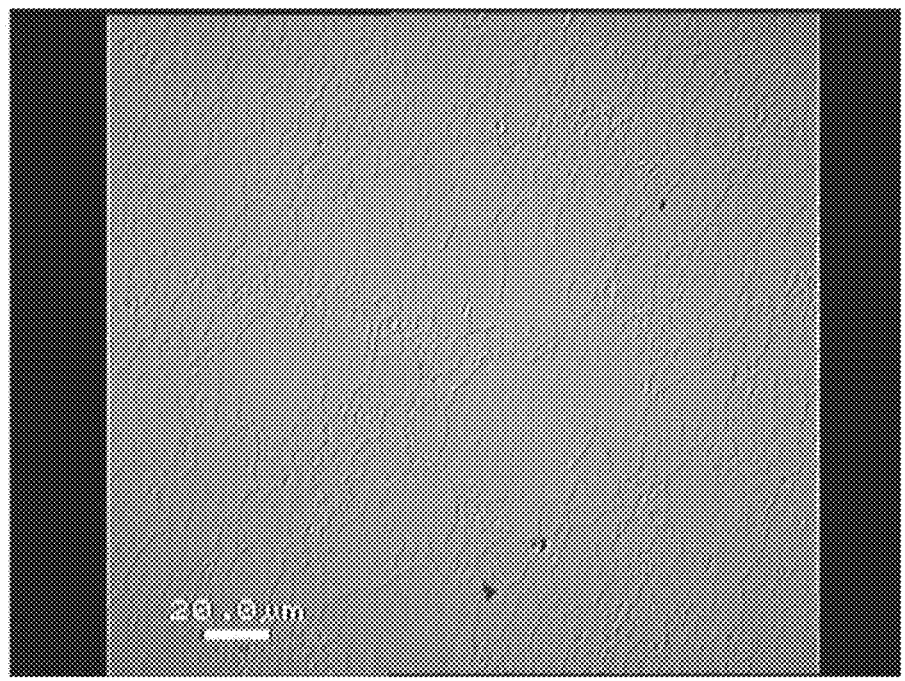
(b)
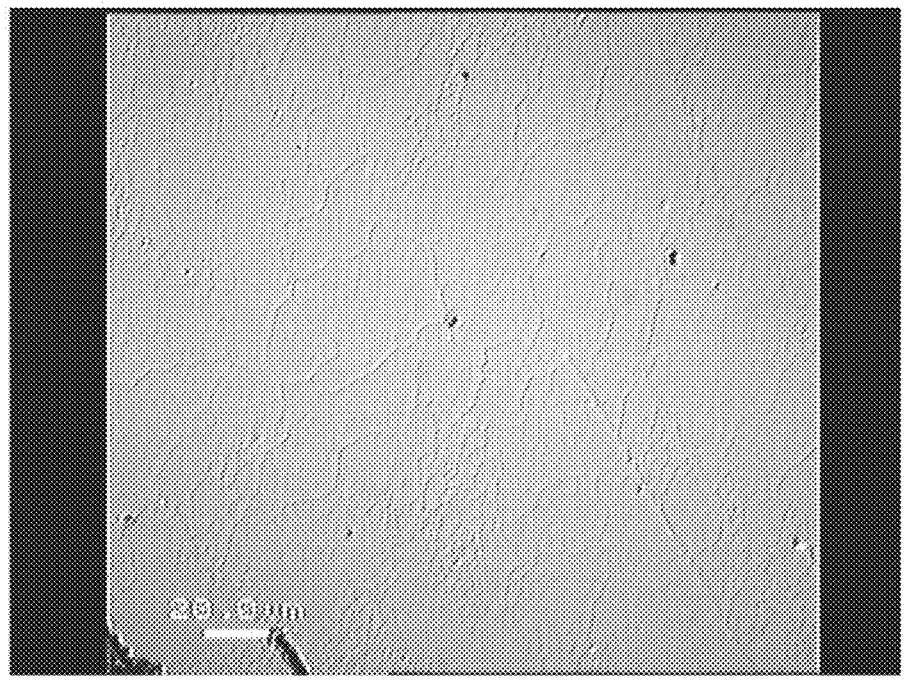

Fig. 4
(a)
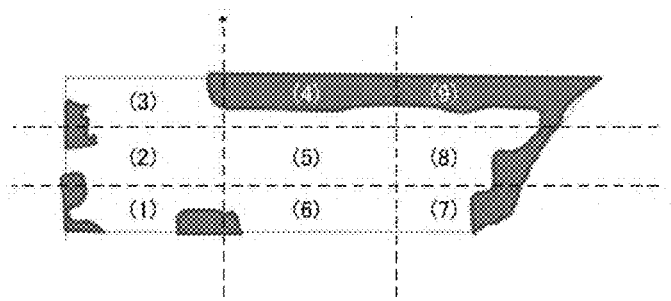
(b)
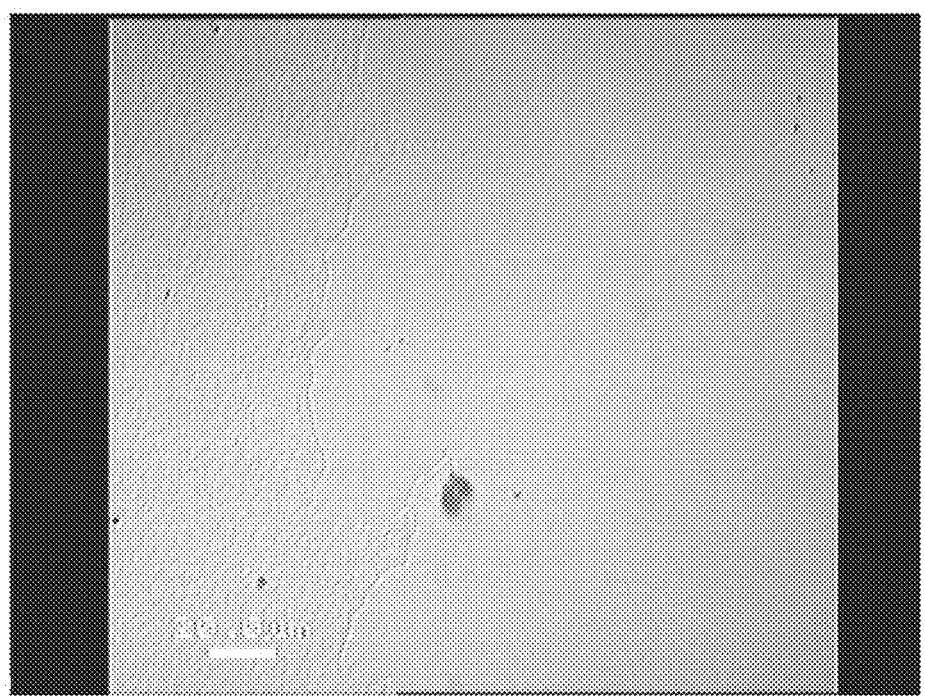

Fig. 5
(a)
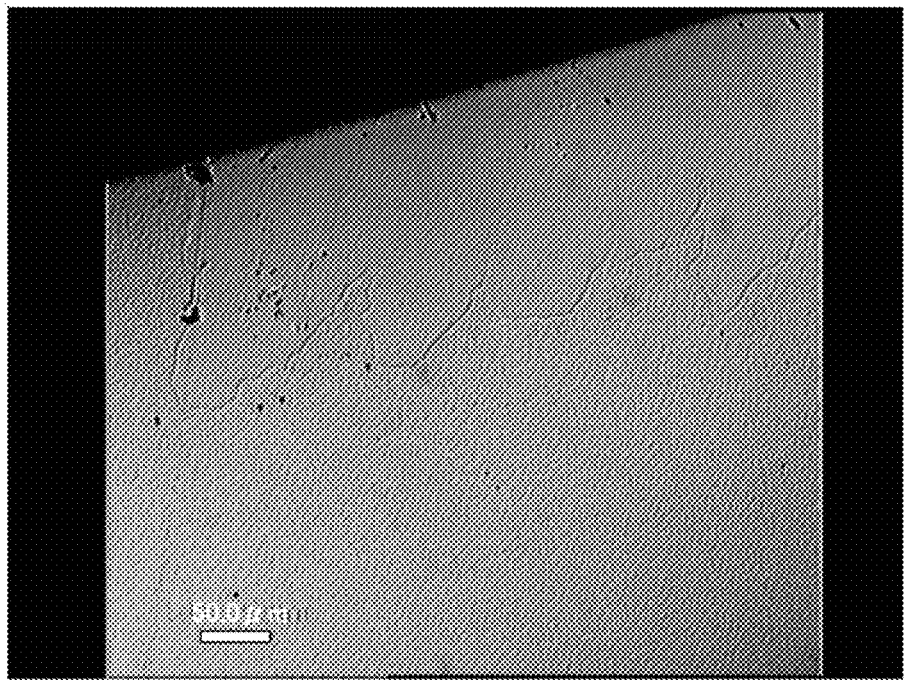
(b)
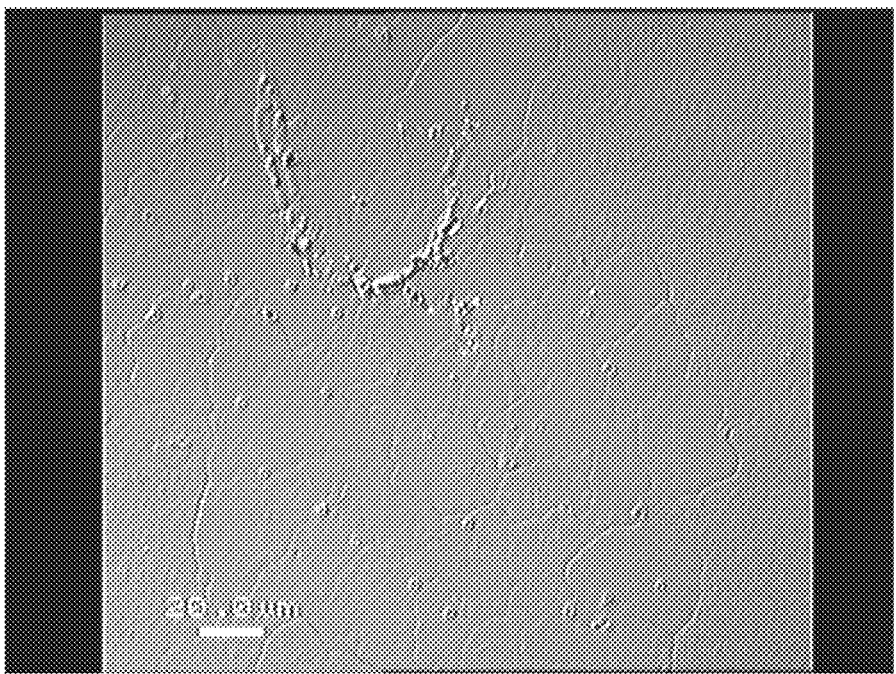

Fig. 6
(a)
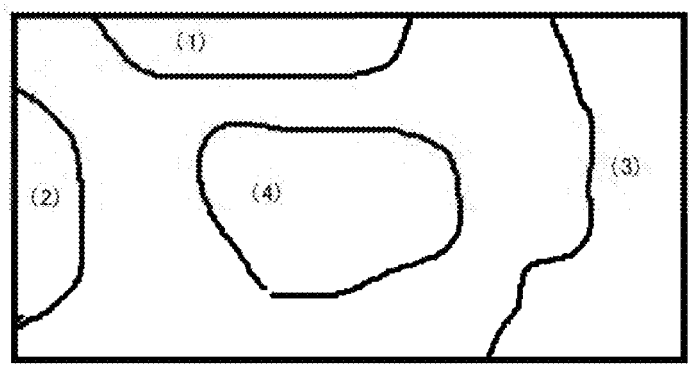
(b)
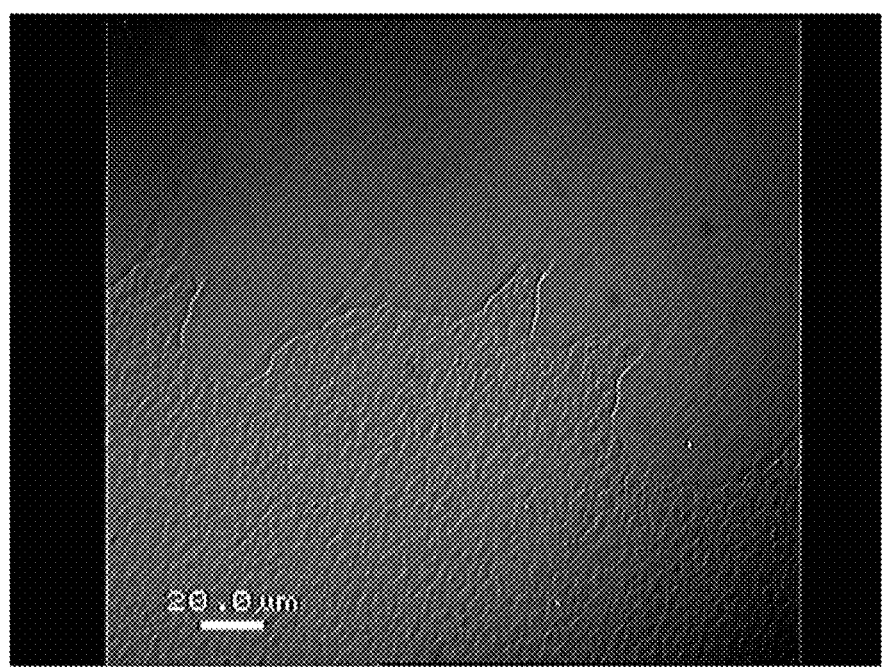

Fig. 7
(a)
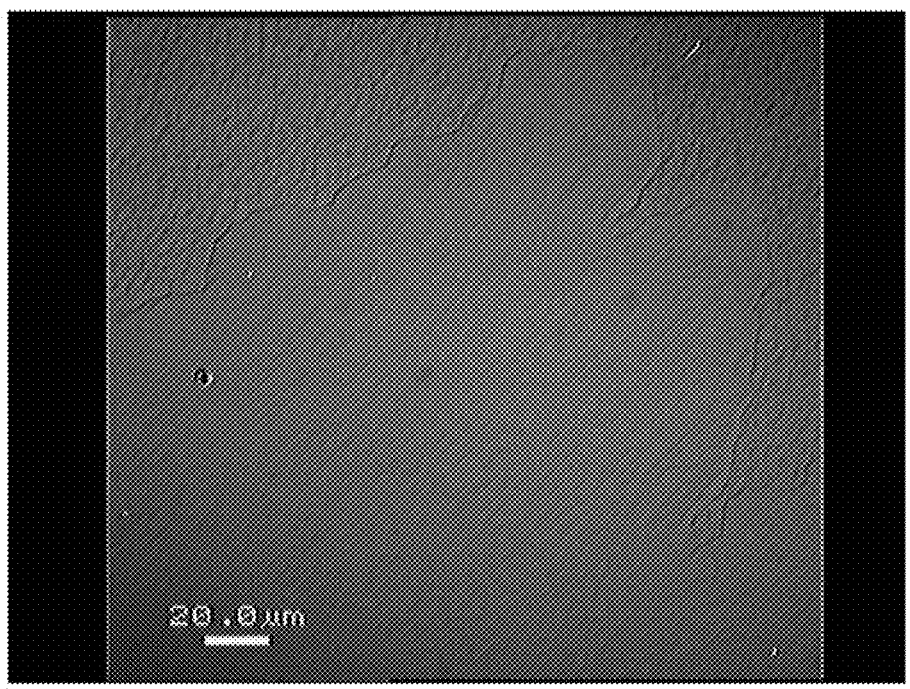
(b)
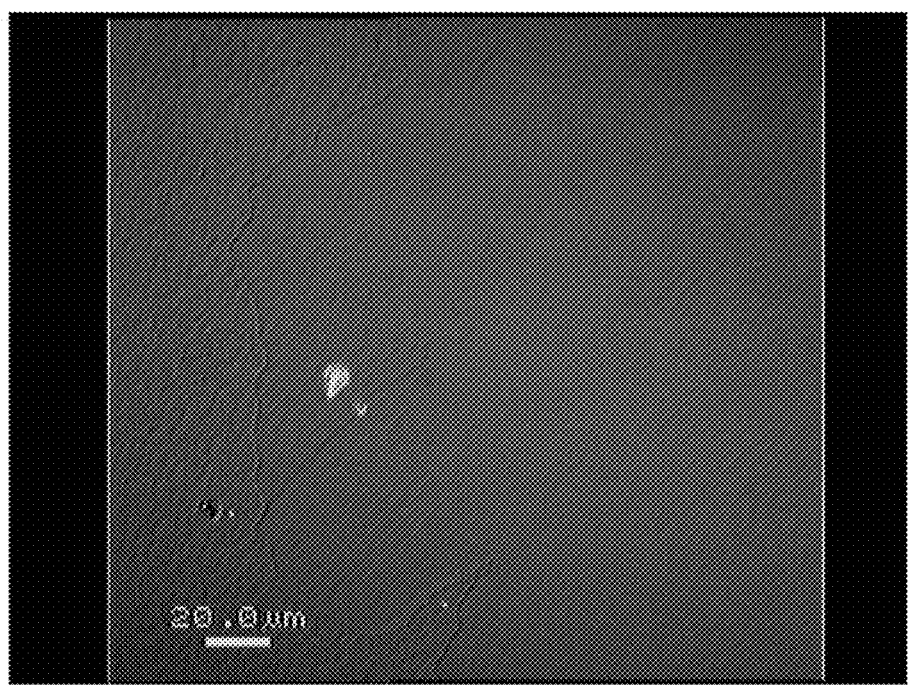

Fig. 8
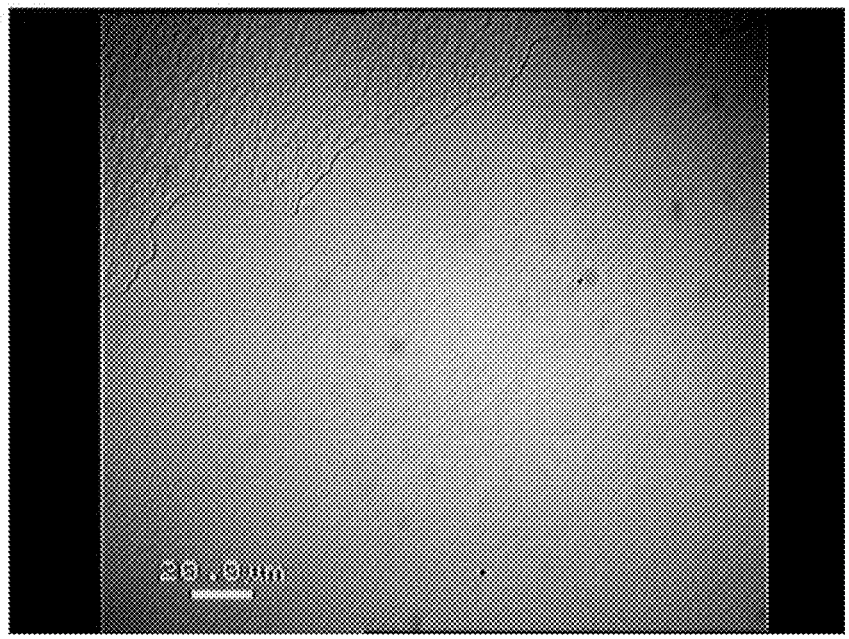
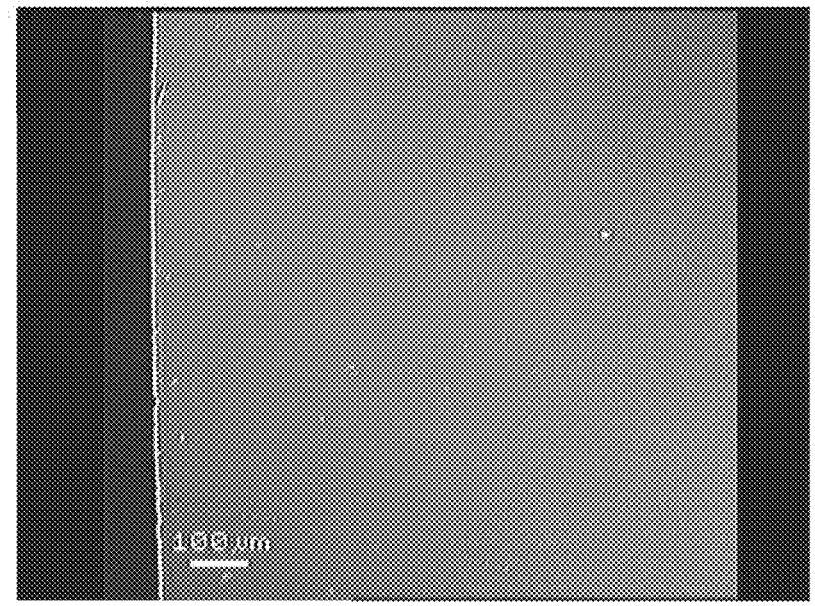

Fig. 9
(a)
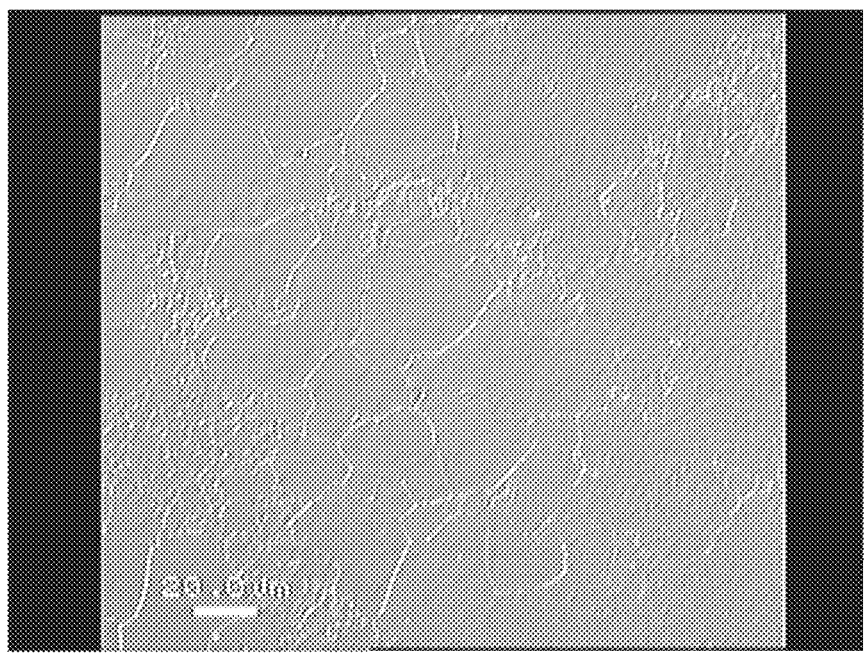
(b)
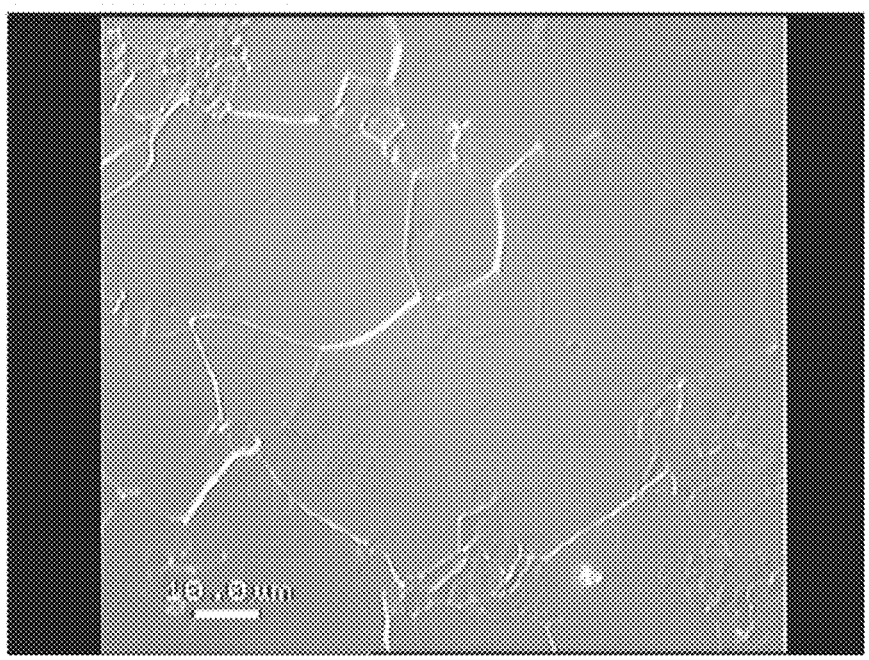

Fig. 14
(a)
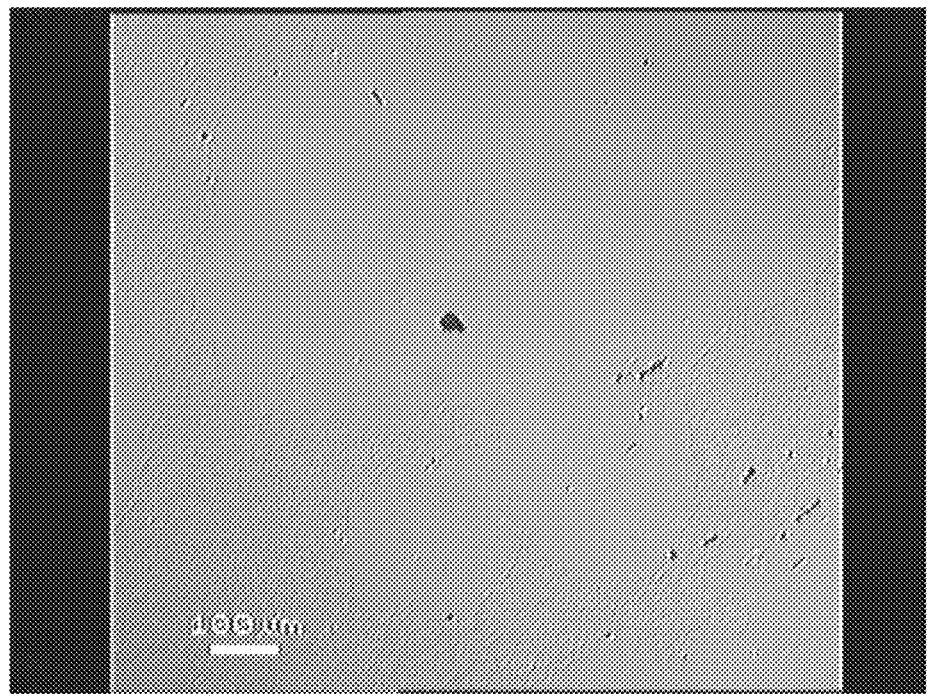
(b)
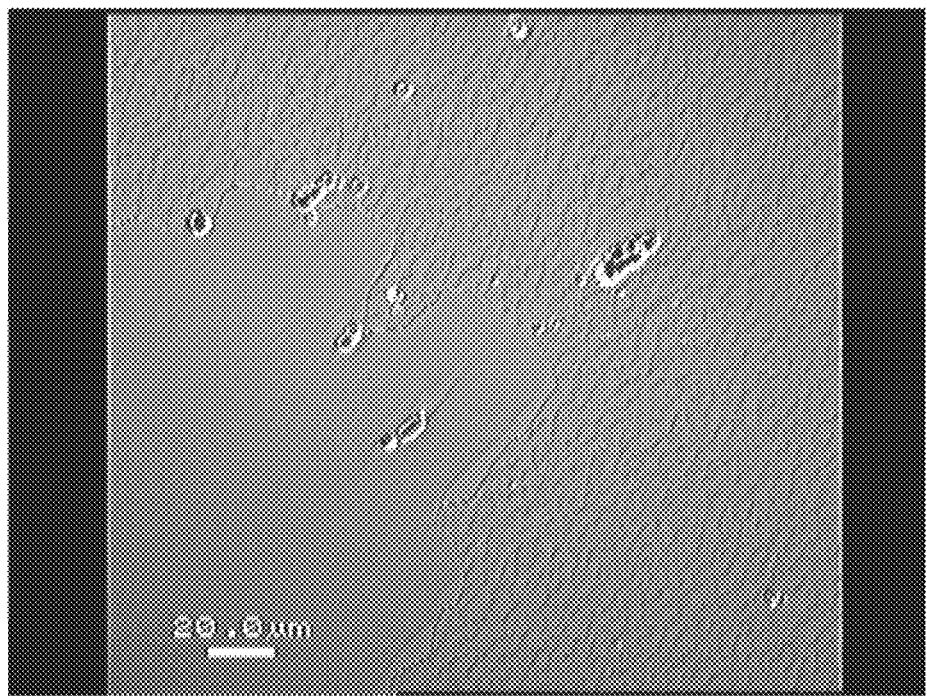

Fig. 15
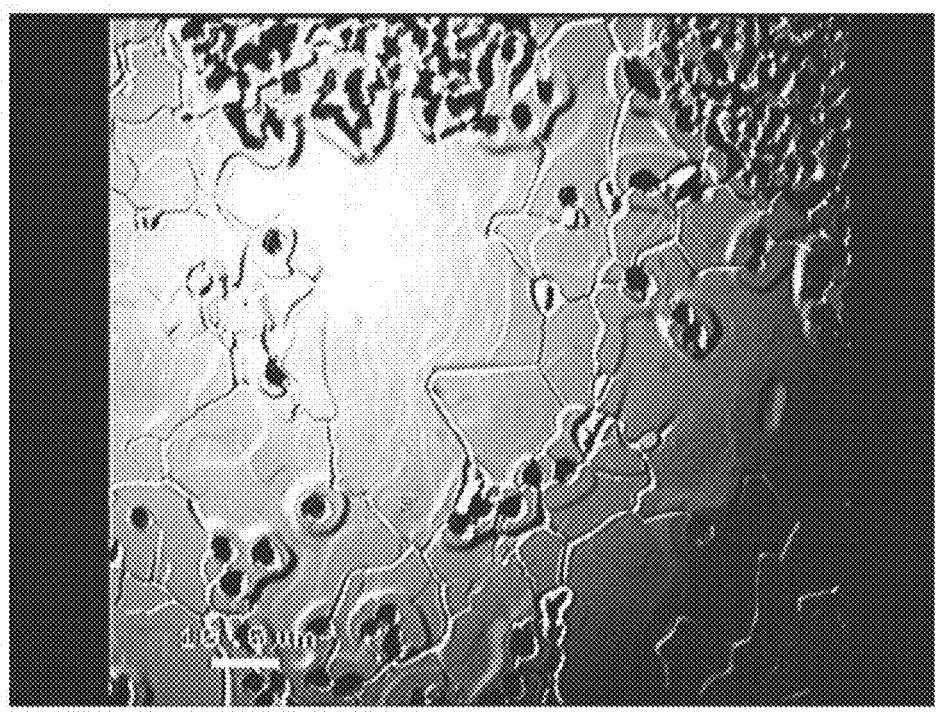
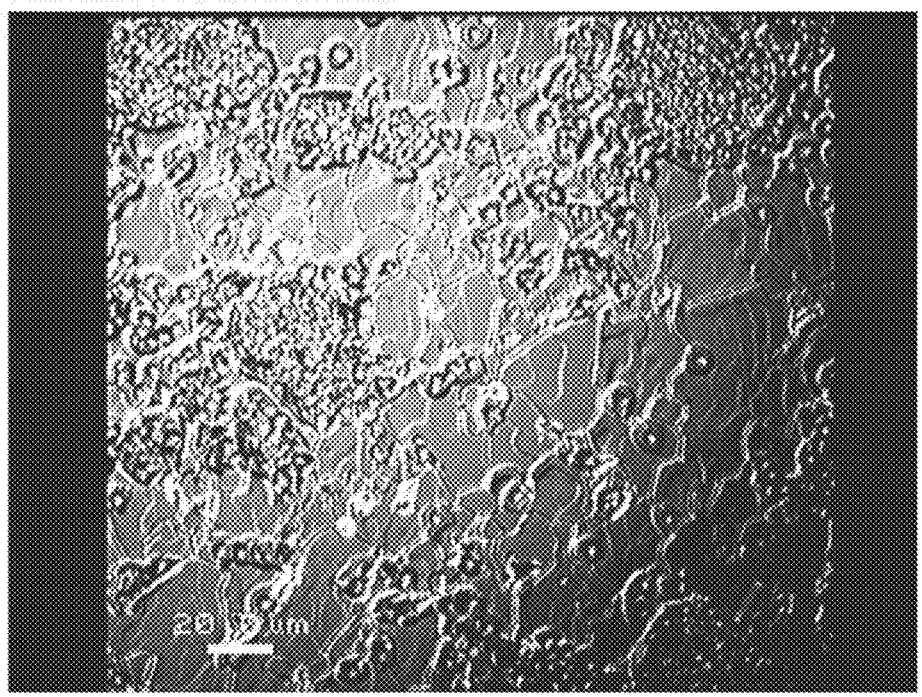

Fig. 17
(a)
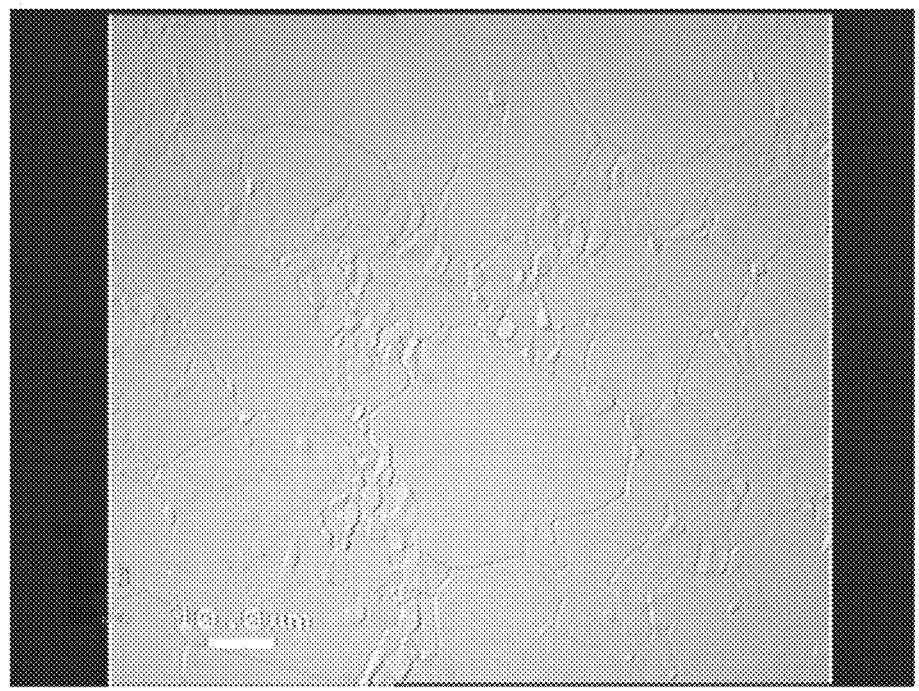
(b)
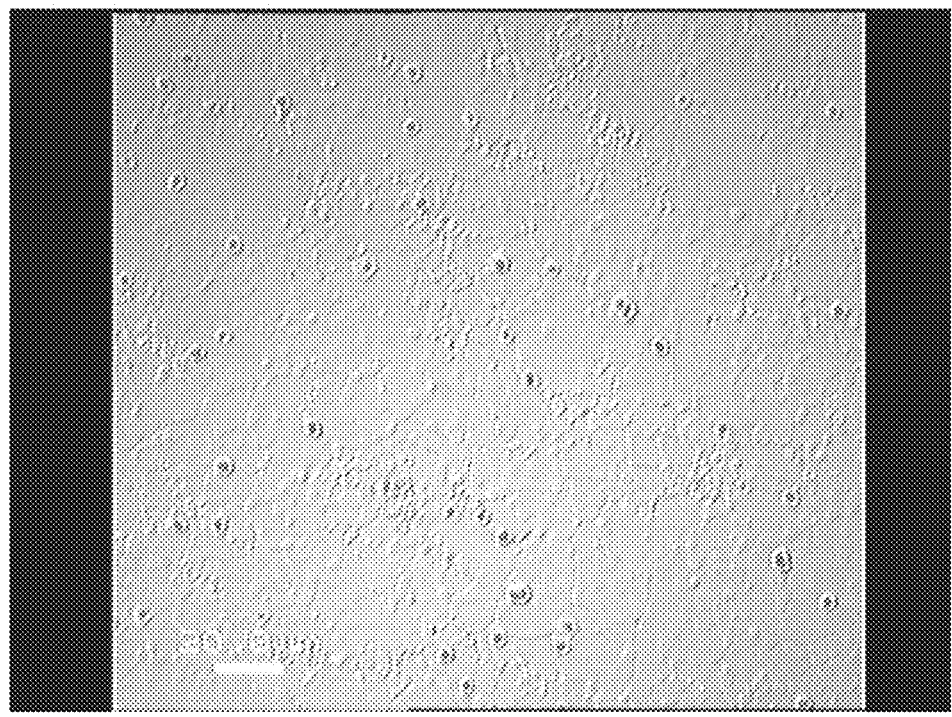

METHOD FOR PRODUCING CATALYTIC METAL LAYER AND METHOD FOR PRODUCING GRAPHENE MATERIAL

TECHNICAL FIELD

The present invention relates to a method for producing a catalytic metal layer and a method for producing a graphene material.

BACKGROUND ART

Graphene is a two-dimensional material which is a planar monolayer composed of fused six-membered rings of carbon atoms. It is said that graphene has an electron mobility 100 or more times higher than silicon. In recent years, a transistor including graphene serving as a channel material has been reported (see PTL 1). In PTL 1, a film pattern composed of a catalytic metal is formed on an insulating substrate by evaporation. A graphene sheet is grown on the film pattern. Then a drain electrode and a source electrode are formed on both sides of the graphene sheet, and a gate electrode is formed on the graphene sheet with a gate insulating film provided therebetween. Here, the film pattern of the catalytic metal is separated by an insulating film. However, the graphene sheet has a structure in which graphene sheet portions extend from the film pattern located on both sides of an insulating separation film and are connected together on the insulating separation film because the graphene sheet portions extend transversely from ends of the film pattern. The literature states that examples of the catalytic metal used include metals, such as cobalt, iron, and nickel.

CITATION LIST

Patent Literature

PTL 1: Japanese Unexamined Patent Application Publication No. 2009-164432

SUMMARY OF INVENTION

Technical Problem

However, in the case where a graphene sheet is produced by the method described in PTL 1, the electron mobility is sometimes reduced at the boundary where the graphene sheet portions extend from the film pattern located on both sides are connected together. To improve the electron mobility and produce a transistor with better properties, it has been desired to enable a graphene sheet to be produced in a large region without connecting graphene sheet portions together. If a large graphene sheet can be produced, such a large graphene sheet is significantly useful not only for such a transistor but also for many applications.

To produce such a large-area good-quality graphene, a catalytic metal layer used to grow a graphene sheet preferably has large grains (crystal grains). It has thus been desired to produce a catalytic metal layer having larger grains.

The present invention has been accomplished to overcome the foregoing problems. The present invention mainly aims to produce a catalytic metal layer having large grains.

Solution to Problem

The inventors have conducted extensive studies on production conditions when a catalytic metal deposited on a substrate in the form of a film is crystallized by heat treatment into a catalytic metal layer and have found that the catalytic metal is partially aggregated at the time of the heat treatment, in some cases. It has also been found that the optimization of heat-treatment conditions inhibits the aggregation to enable a catalytic metal layer having large grains to be produced. These findings have led to the completion of the present invention.

A first method for producing a catalytic metal layer of the present invention includes the steps of:

(a) forming a film composed of a catalytic metal on a substrate, the catalytic metal having the function of promoting graphenization;

(b) raising the temperature of the catalytic metal to a heating temperature in a high-temperature region where a high affinity between the catalytic metal and the substrate is achieved;

(c) lowering the temperature of the catalytic metal from the heating temperature to a low-temperature region where a misfit dislocation is introduced between the substrate and the catalytic metal, and lowering the temperature of the catalytic metal so as to satisfy at least one of a first requirement in which the temperature of the catalytic metal is lowered at a rate of temperature decrease of 2° C./min or more while the temperature of the catalytic metal is in an intermediate-temperature region having a temperature lower than the heating temperature and higher than the low-temperature, and a second requirement in which the temperature of the catalytic metal is lowered in such a manner that the length of time that the temperature of the catalytic metal is in the intermediate-temperature region is within 50 minutes; and (d) crystallizing the catalytic metal into a catalytic metal layer while the temperature of the catalytic metal is a temperature equal to or lower than the upper limit of the low-temperature region.

According to the first method for producing a catalytic metal layer, it is possible to produce a catalytic metal layer having large grains. The reason such an effect is provided is unclear but is speculated as follows. In the step (b), the temperature of the catalytic metal is raised to the heating temperature in the high-temperature region where a high affinity between the catalytic metal and the substrate is achieved. The rise in temperature to the high-temperature region presumably aids the arrangement of atoms of the catalytic metal, thus facilitating the crystallization in the step (d). In the step (c), the temperature of the catalytic metal is lowered from the heating temperature to the low-temperature region where a misfit dislocation is introduced between the substrate and the catalytic metal. Here, the decrease in temperature causes tensile stress in the catalytic metal because of a difference in thermal expansion coefficient between the catalytic metal and the substrate, thereby possibly forming a crack at the boundary between adjacent grains of the catalytic metal. The crack promotes the aggregation of the catalytic metal. However, in the case where the temperature is further lowered, when the temperature is relatively lowered from a temperature from which the decrease in temperature starts, i.e., the heating temperature in the step (b), by a certain temperature, the stress in the catalytic metal exceeds the critical value for the introduction of the misfit dislocation. As a result, the misfit dislocation is introduced between the substrate and the catalytic metal to relieve the stress in the catalytic metal. Thus, the occurrence of a new cracking is inhibited in a state in which the temperature is lowered to the low-temperature region where the misfit dislocation is introduced. A region with a temperature lower than the heating temperature and higher than the low-temperature is defined as an intermediate-temperature region. In the step (c), the temperature is lowered so as to satisfy at least one of a first requirement in which the temperature is lowered at a rate of temperature decrease of 2° C./min or more while the temperature of the catalytic metal is in the intermediate-temperature region, and a second requirement in which the temperature is lowered in such a manner that the length of time that the temperature of the catalytic metal is in the intermediate-temperature region is within 50 minutes. Thus, the temperature of the catalytic metal passes through the intermediate-temperature region before the grains of the catalytic metal extend to come into contact with each other, i.e., in a state in which no grain boundaries are present. Alternatively, even if a grain boundary is present, the temperature of the catalytic metal passes through the intermediate-temperature region before the grain boundary cracks. This presumably results in the inhibition of the occurrence of the aggregation. The reason the crack formed at the grain boundary of the catalytic metal promotes the aggregation is speculated as follows. The formation of a crack results in the exposure of a surface of the substrate. As a result, the catalytic metal aggregates to reduce the surface area of the catalytic metal and the interfacial area between the catalytic metal and the substrate. Here, in the case where the sum of the surface energy of the catalytic metal and the interfacial energy between the catalytic metal and the substrate is larger than the surface energy of the substrate, even if the surface energy is added by the extension of the substrate surface, the sum total of the surface energies of the substrate and the catalytic metal and the interfacial energy between the catalytic metal and the substrate is reduced, which is energetically favorable. It is thus speculated that the catalytic metal can continue to aggregate. In the step (d), the catalytic metal is crystallized into the catalytic metal layer while the temperature of the catalytic metal is a temperature equal to or lower than the upper limit of the low-temperature region. At the temperature equal to or lower than the upper limit of the low-temperature region, as described above, the misfit dislocation is introduced between the substrate and the catalytic metal to relieve the stress in the catalytic metal, thereby inhibiting the occurrence of a new cracking. The crystallization of the catalytic metal in this state presumably results in the extension of the grains while the occurrence of the aggregation is inhibited. It is speculated that by performing the steps (b) to (d) as described above, the occurrence of the aggregation of the catalytic metal is inhibited to suppress the inhibition of the extension of the grains due to the aggregation, thereby resulting in the catalytic metal layer having large grains.

A second method for producing a catalytic metal layer of the present invention includes the steps of:

(a) forming a film composed of nickel on a sapphire substrate, the nickel serving as a catalytic metal having the function of promoting graphenization;

(b) raising the temperature of the catalytic metal to a heating temperature of 900° C. or higher and 1400° C. or lower;

(c) lowering the temperature of the catalytic metal from the heating temperature to a temperature of (the heating temperature—100)° C. or lower, and lowering the temperature of the catalytic metal so as to satisfy at least one of a first requirement in which the temperature of the catalytic metal is lowered at a rate of temperature decrease of 2° C./min or more while the temperature of the catalytic metal is lower than the heating temperature and higher than (the heating temperature—100)° C., and a second requirement in which the temperature of the catalytic metal is lowered in such a manner that the length of time that the temperature of the catalytic metal is in a region having a temperature lower than the heating temperature and higher than (the heating temperature—100)° C. is within 50 minutes; and (d) crystallizing the catalytic metal into a catalytic metal layer while the temperature of the catalytic metal is (the heating temperature—100)° C. or lower.

According to the second method for producing a catalytic metal layer, it is possible to produce a catalytic metal layer having large grains. The reason such an effect is provided is unclear but is speculated as follows. In the step (b), the temperature of the catalytic metal is raised to a heating temperature of 900° C. or higher and 1400° C. or lower, so that a high affinity between nickel serving as the catalytic metal and the sapphire substrate is achieved. This presumably results in aids the arrangement of nickel atoms, thus facilitating the crystallization in the step (d). In the step (c), the temperature of nickel is lowered from the heating temperature to a temperature of (the heating temperature—100)° C. or lower. Here, the decrease in temperature causes tensile stress in nickel because of a difference in thermal expansion coefficient between nickel and the sapphire substrate, thereby possibly forming a crack at the boundary between adjacent grains of nickel. The crack promotes the aggregation of nickel. However, in the case where the temperature is further lowered, when the temperature is lowered from a temperature from which the decrease in temperature starts, i.e., the heating temperature in the step (b), to a temperature of (the heating temperature—100)° C. or lower, the stress in nickel exceeds the critical value for the introduction of the misfit dislocation. As a result, the misfit dislocation is introduced between the sapphire substrate and nickel to relieve the stress in nickel. Thus, the occurrence of a new cracking is inhibited in a state in which the temperature is lowered to a temperature of (the heating temperature–100)° C. or lower at which the misfit dislocation is introduced. In the step (c), the temperature is lowered so as to satisfy at least one of a first requirement in which the temperature is lowered at a rate of temperature decrease of 2° C./min or more while the temperature of nickel is higher than a temperature of (the heating temperature–100)° C. and lower than the heating temperature, and a second requirement in which the temperature is lowered in such a manner that the length of time that the temperature of nickel is in the range of higher than a temperature of (the heating temperature—100)° C. and lower than the heating temperature is within 50 minutes. Thus, the temperature of nickel is a temperature of (the heating temperature–100)° C. or lower before the grains of nickel extend to come into contact with each other, i.e., in a state in which no grain boundaries are present. Alternatively, even if a grain boundary is present, the temperature of the catalytic metal reaches a temperature of (the heating temperature–100)° C. or lower before the grain boundary cracks. This presumably results in the inhibition of the occurrence of the aggregation. The reason the crack formed at the grain boundary of nickel promotes the aggregation is speculated as follows. The formation of a crack results in the exposure of a surface of the sapphire substrate. As a result, the surface area of nickel and the interfacial area between nickel and the sapphire substrate are reduced. Here, in a temperature region of higher than a temperature of (the heating temperature—100)° C. and lower than the heating temperature, the sum of the surface energy of nickel and the interfacial energy between nickel and the sapphire substrate is larger than the surface energy of the sapphire substrate. Even if the surface energy is added by the extension of the substrate surface, the sum total of the surface energies of the sapphire substrate and nickel and the interfacial energy between nickel and the sapphire substrate is reduced, which is energetically favorable. It is thus speculated that nickel can continue to aggregate. In the step (d), the catalytic metal is crystallized into the catalytic metal layer in the state in which the temperature of nickel is a temperature of (the heating temperature—100)° C. or lower. In this state, as described above, the misfit dislocation is introduced between the substrate and nickel to relieve the stress in nickel, thereby inhibiting the occurrence of a new cracking. The crystallization of nickel in this state presumably results in the extension of the grains while the occurrence of the aggregation is inhibited. It is speculated that by performing the steps (b) to (d), the occurrence of the aggregation of nickel serving as the catalytic metal is inhibited to suppress the inhibition of the extension of the grains due to the aggregation, thereby resulting in the catalytic metal layer having large grains.

A method for producing a graphene material according to the present invention includes the steps of:

(e) growing graphene by supplying the carbon source to the surface of a catalytic metal layer formed on a substrate, the catalytic metal layer being formed by any of the foregoing methods for producing a catalytic metal layer according to the present invention, and (f) separating the graphene serving as a graphene material from the catalytic metal layer.

According to the method for producing a graphene material, it is possible to produce a large-area graphene material because graphene is grown on the catalytic metal layer having large grains. Here, the graphene material refers to a material including a single or multiple layers, each of the layers containing monolayer graphene composed of fused six-membered rings of carbon atoms. The function of promoting graphenization indicates the function of promoting the formation of graphene by bringing it into contact with the carbon source to permit carbon components in the carbon source to bond together into graphene.

BRIEF DESCRIPTION OF DRAWINGS

FIG. 2 illustrates explanatory drawings of a bank structure of a catalytic metal layer.

FIG. 3 illustrates photomicrographs of a surface of a catalytic metal layer according to Experimental Example 1.

FIG. 4 illustrates an explanatory drawing and a photomicrograph of a surface of a catalytic metal layer according to Experimental Example 2.

FIG. 5 illustrates photomicrographs of a surface of a catalytic metal layer according to Experimental Example 2.

FIG. 6 illustrates an explanatory drawing and a photomicrograph of a surface of a catalytic metal layer according to Experimental Example 3.

FIG. 7 illustrates photomicrographs of a surface of a catalytic metal layer according to Experimental Example 3.

FIG. 8 illustrates photomicrographs of a surface of a catalytic metal layer according to Experimental Example 3.

FIG. 9 illustrates photomicrographs of a surface of a catalytic metal layer according to Experimental Example 4.

FIG. 14 illustrates photomicrographs of a surface of a catalytic metal layer according to Experimental Example 9.

FIG. 15 illustrates photomicrographs of a surface of a catalytic metal layer according to Experimental Example 10.

FIG. 17 illustrates photomicrographs of a surface of a catalytic metal layer according to Experimental Example 12.

DESCRIPTION OF EMBODIMENTS

Figure 1:
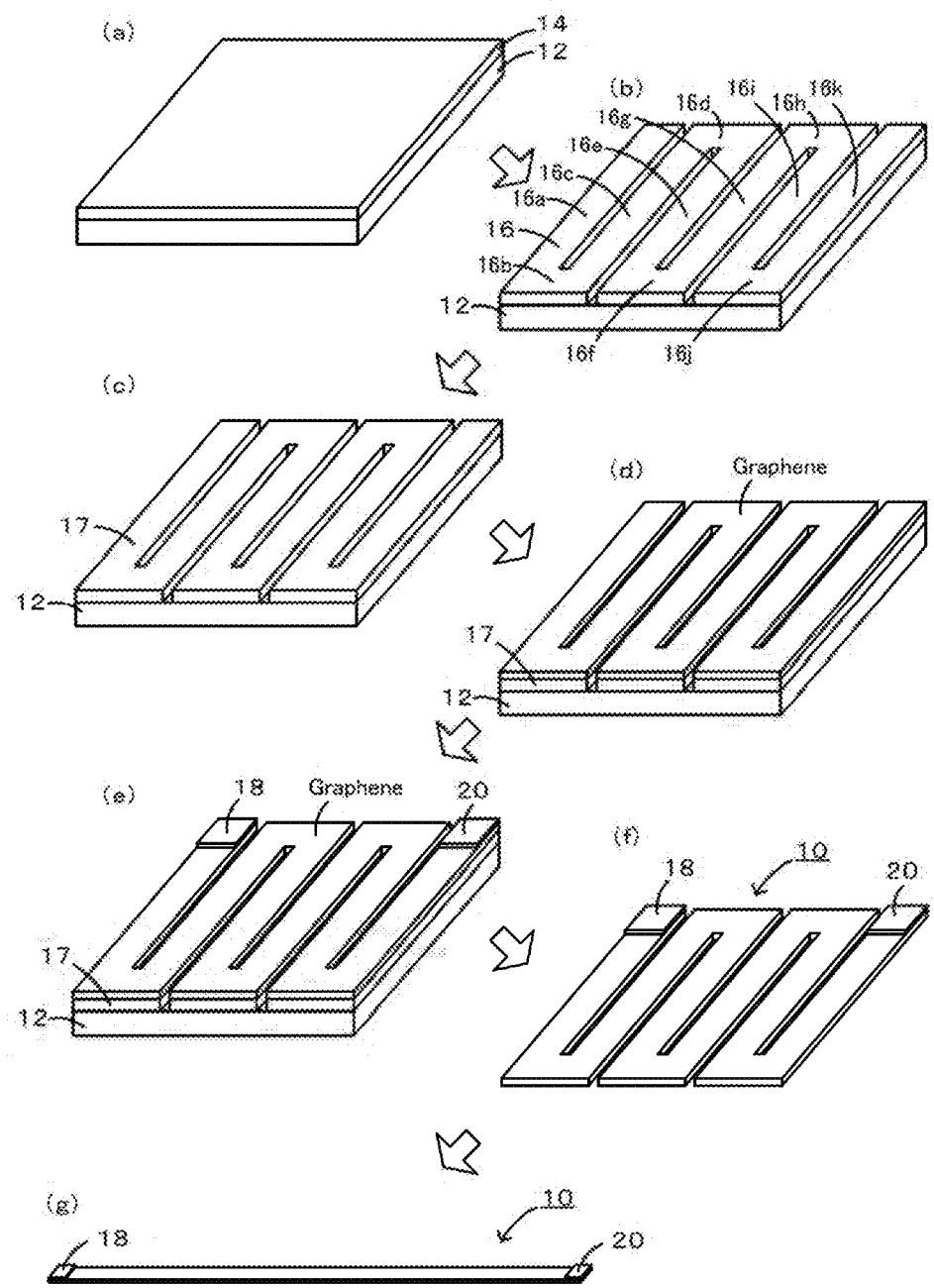
FIG. 1 illustrates explanatory drawings (perspective views) of a procedure for producing a catalytic metal layer 17 and a graphene material 10.

A method for producing a catalytic metal layer of the present invention includes the steps of: (a) forming a film composed of a catalytic metal on a substrate, the catalytic metal having the function of promoting graphenization; (b) raising the temperature of the catalytic metal to a heating temperature in a high-temperature region where a high affinity between the catalytic metal and the substrate is achieved; (c) lowering the temperature of the catalytic metal from the heating temperature to a low-temperature region where a misfit dislocation is introduced between the substrate and the catalytic metal, and lowering the temperature of the catalytic metal so as to satisfy at least one of a first requirement in which the temperature of the catalytic metal is lowered at a rate of temperature decrease of 2° C./min or more while the temperature of the catalytic metal is in an intermediate-temperature region having a temperature lower than the heating temperature and higher than the low-temperature, and a second requirement in which the temperature of the catalytic metal is lowered in such a manner that the length of time that the temperature of the catalytic metal is in the intermediate-temperature region is within 50 minutes; and (d) crystallizing the catalytic metal into a catalytic metal layer while the temperature of the catalytic metal is a temperature equal to or lower than the upper limit of the low-temperature region.

A method for producing a graphene material according to the present invention includes (e) supplying a carbon source to a surface of the catalytic metal layer formed on the substrate to grow graphene, the catalytic metal layer being formed in the steps (a) to (d); and (f) separating the graphene serving as a graphene material from the catalytic metal layer.

In the method for producing a catalytic metal layer according to the present invention, examples of the substrate used in the step (a) include, but are not particularly limited to, c-plane sapphire substrates, a-plane sapphire substrates, Si substrates each having a surface on which a $SiO_2$ layer having a very small thickness (for example, about 0.2 nm to about 0.5 nm) is formed, SiC substrates, ZnO substrates, GaN substrates (including template substrates), substrates composed of high-melting-point metals, such as W, and substrates composed of metals each having a catalytic ability to promote graphenization. The main body of the substrate is preferably a single-crystal substrate because the use of the single-crystal substrate is more likely to align the crystal orientation of the catalytic metal layer. However, the orientation of the catalytic metal layer can be aligned without using the single-crystal substrate. The main body of the substrate is basically required to be used without degradation during the steps (b) to (d) of forming the catalytic metal layer and the subsequent step (e) of growing graphene on the catalytic metal layer. The thickness of the substrate is not particularly limited and may be, for example, about 100 μm to about 500 μm. In the case where a Si substrate having a surface on which a $SiO_2$ layer is formed is used as the main body of the substrate, the substrate preferably includes a layer composed of, for example, Ti, Pt, or $SiO_2$, in order to inhibit a reaction between Si and the catalytic metal layer, the layer being located closer to the surface than the $SiO_2$ layer. The thickness of the layer is not particularly limited and may be, for example, about 1 nm to about 10 nm.

In the method for producing a catalytic metal layer according to the present invention, examples of the catalytic metal used in the step (a) include Cu, Ni, Co, Ru, Fe, Pt, and Au. Of these metals, a metal having a triangular lattice (a structure in which metal atoms are arranged at the vertices of a triangle) on a surface is preferred. For example, FCC (111) plane, the BCC (110) plane, and the HCP (0001) plane provide the triangular lattice. The thickness of the film of the catalytic metal is not particularly limited and may be, for example, about 10 nm to about 500 nm. A larger thickness of the film of the catalytic metal provides the effect of further inhibiting the aggregation of the catalytic metal in the subsequent step. Thus, the film of the catalytic metal preferably has a thickness of 200 nm or more.

In the method for producing a catalytic metal layer according to the present invention, the formation of the film of the catalytic metal on the substrate in the step (a) may be performed by, for example, evaporation or sputtering. As the evaporation, an electron-beam evaporation method may be employed. The formation may be performed by a plasma sputtering method. The film of the catalytic metal may be formed into a predetermined shape. For example, patterning may be performed by a known photolithography method. In this case, the film of the catalytic metal may be formed on the entire surface of the substrate. A resist pattern may be formed so as to leave the catalytic metal having a predetermined shape. Then wet etching or dry etching may be performed. With respect to the wet etching, an etching solution may be appropriately selected, depending on the type of catalytic metal. With respect to the dry etching, a gas used may be appropriately selected, depending on the type of catalytic metal. To form the catalytic metal having a predetermined shape, the catalytic metal may be deposited by evaporation or sputtering with a shadow mask that covers a portion other than the predetermined shape.

In the step (b) of the method for producing a catalytic metal layer according to the present invention, the temperature of the catalytic metal is raised to the heating temperature in the high-temperature region, which is a region where a high affinity between the catalytic metal and the substrate is achieved. The rise in temperature to the high-temperature region results in the annealing of the catalytic metal, a high affinity between the catalytic metal and the substrate, and aid to the arrangement of the atoms of the catalytic metal. The high-temperature region may be defined as a region in which a high affinity between the catalytic metal and the substrate is achieved and which has a temperature equal to or higher than a predetermined threshold temperature, depending on, for example, the catalytic metal and the material of the substrate. The high-temperature region may also be expressed as a temperature region sufficient to thermally destabilize the grain boundaries of the catalytic metal, in other words, a temperature region such that even if grains are already present, the grains disappear by fusion. Furthermore, the high-temperature region may be defined as a region with a temperature lower than the melting points of the catalytic metal and the substrate and lower than a reaction temperature between the catalytic metal and the substrate, and the upper limit of the high-temperature region may be defined. For example, (the lowest temperature among the melting point of the catalytic metal, the melting point of the substrate, and the reaction temperature between the catalytic metal and the substrate—50)° C. may be defined as the upper limit of the high-temperature region. The high-temperature region is preferably selected so as to be lower than the melting point of the catalytic metal, lower than the melting point of the substrate, lower than the reaction temperature between the catalytic metal and the substrate, and sufficiently high to achieve a high affinity between the substrate and the catalytic metal. For example, in the case where the catalytic metal is nickel and where the substrate is composed of sapphire, the high-temperature region may be a region having a temperature of 900° C. or higher and 1400° C. or lower and preferably 950° C. or higher and 1050° C. or lower. In the step (b), after the temperature of the catalytic metal is raised to the heating temperature, the catalytic metal may be held at the heating temperature for a predetermined time. The predetermined time may be empirically determined as, for example, a time sufficient to anneal the catalytic metal. For example, in the case where the catalytic metal is nickel and where the substrate is composed of sapphire, the predetermined time is preferably 5 minutes or more and may be, for example, 20 minutes or more. The predetermined time may be 20 minutes or more and 40 minutes or less. In the step (b), in the case of a low rate of temperature rise for a period of time required for the temperature of the catalytic metal to reach the heating temperature, the catalytic metal is likely to aggregate from any cause, for example, stress due to the difference in thermal expansion coefficient between the catalytic metal and the substrate. Thus, the rate of temperature rise is preferably fast to some extent. For example, the rate of temperature rise may be, but not particularly limited to, 20° C./min or more.

In the step (c) of the method for producing a catalytic metal layer, the temperature of the catalytic metal is lowered from the heating temperature to the low-temperature region where a misfit dislocation is introduced between the substrate and the catalytic metal. Moreover, the temperature is lowered so as to satisfy at least one of the first requirement in which the temperature is lowered at a rate of temperature decrease of 2° C./min or more while the temperature of the catalytic metal is in the intermediate-temperature region with a temperature lower than the heating temperature and higher than the low-temperature, and the second requirement in which the temperature is lowered in such a manner that the length of time that the temperature of the catalytic metal is in the intermediate-temperature region is within 50 minutes. In this way, the temperature is lowered in such a manner that the temperature of the catalytic metal rapidly reaches the low-temperature region from the heating temperature, thereby inhibiting the occurrence of the aggregation of the catalytic metal. With respect to the first requirement, a higher rate of temperature decrease permits the temperature of the catalytic metal to more rapidly reach the low-temperature region, thereby inhibiting the occurrence of the aggregation, which is preferable. For example, the rate of temperature decrease may be 3° C./min or more or 5° C./min or more. At an excessively high rate of temperature decrease, although the occurrence of the aggregation of the catalytic metal can be inhibited, a large number of nuclei of grains are formed in the catalytic metal to form a large number of small grains. It can take a long time to bond the grains together. Thus, the rate of temperature decrease is preferably 20° C./min or less. The rate of temperature decrease may be 10° C./min or less or 7° C./min or less. The rate of temperature decrease may be 3° C./min or more and 20° C./min or less. The rate of temperature decrease may be changed during a decrease in temperature as long as it is in the range described above. After the temperature of the catalytic metal is lowered to a temperature in the low-temperature region, the rate of temperature decrease may be, for example, less than 2° C./min, which is outside the range described above, for example. As with the first requirement, also in the case of the second requirement, a shorter length of time that the temperature of the catalytic metal is in the intermediate-temperature region is preferred because the occurrence of the aggregation is further inhibited. At an excessively short length of time that the temperature of the catalytic metal is in the intermediate-temperature region, it can take a long time to bond the grains together. Thus, the time is preferably 5 minutes or more.

The low-temperature region is defined as a region having a temperature equal to or lower than a temperature that is relatively lowered from a temperature from which the decrease in temperature starts, i.e., the heating temperature in the step (b), by a certain temperature. In the case where a decrease in temperature is performed, when the temperature is relatively lowered from the heating temperature by a certain temperature, the stress in the catalytic metal exceeds the critical value for the introduction of the misfit dislocation. As a result, the misfit dislocation is introduced between the substrate and the catalytic metal to relieve the stress in the catalytic metal. The temperature at this time is defined as the upper limit of the low-temperature region. The low-temperature region is defined as a relative region with respect to the heating temperature. For example, in the case where the catalytic metal is nickel and where the substrate is composed of sapphire, the low-temperature region is defined as a region with a temperature of (the heating temperature−100)° C. or lower. For example, when the heating temperature is 1000° C., the low-temperature region may be defined as a region with a temperature of 900° C. or lower. The intermediate-temperature region is defined as a region between the heating temperature and the low-temperature region. In the intermediate-temperature region, the decrease in temperature from the heating temperature results in a difference in thermal expansion coefficient between the catalytic metal and the substrate, thereby causing the occurrence of tensile stress in the catalytic metal. However, the misfit dislocation is not introduced. Thus, a crack can be formed at the boundary between adjacent grains of the catalytic metal to cause the aggregation.

In the step (d) of the method for producing a catalytic metal layer according to the present invention, the catalytic metal is crystallized into the catalytic metal layer in the state in which the temperature of the catalytic metal is a temperature equal to or lower than the upper limit of the low-temperature region. This results in the extension of the grains while the occurrence of the aggregation of the catalytic metal is inhibited. As a result, the grains are grown in the step (d) and bonded together to provide a catalytic metal layer having large grains. In the step (d), the catalytic metal is preferably crystallized with the temperature maintained at a temperature of (the upper limit of the low-temperature region—400)° C. or higher. More preferably, the catalytic metal is preferably crystallized with the temperature maintained at a temperature of (the upper limit of the low-temperature region—150)° C. or higher. In this case, the temperature of the catalytic metal is maintained at a temperature equal to or lower than the upper limit of the low-temperature region, thereby inhibiting the promotion of the aggregation of the catalytic metal. Moreover, the catalytic metal is maintained at a relatively high temperature. Thus, the growth rate of the grains is high, resulting in the catalytic metal layer having large grains in a relatively short time. In the step (d), the temperature of the catalytic metal may be lower than the upper limit of the low-temperature region. The catalytic metal may be maintained at a certain temperature. The temperature of catalytic metal may continue to drop at a predetermined rate. For example, the temperature may continue to drop to a predetermined temperature at the same rate from the step (c). For example, in the case where the catalytic metal is nickel and where the substrate is composed of sapphire, in the step (d), the catalytic metal is crystallized at a temperature of (the heating temperature−100)° C. or lower, the temperature of (the heating temperature—100)° C. being the upper limit of the low-temperature region. The catalytic metal is preferably maintained at a temperature of (the heating temperature−500)° C. or higher and (the heating temperature—100)° C. or lower. More preferably, the catalytic metal is crystallized with the temperature maintained at (the heating temperature−250)° C. or higher and (the heating temperature—100)° C. or lower.

In the production steps of the catalytic metal layer according to the present invention, each of the steps (b) to (d) may be performed at atmospheric pressure in a hydrogen atmosphere, at atmospheric pressure in an inert atmosphere, or in a vacuum atmosphere. In particular, each of the steps (b) to (d) is preferably performed at atmospheric pressure in the hydrogen atmosphere. It is believed that by performing the steps at atmospheric pressure in the hydrogen atmosphere, hydrogen adheres or is bonded to surfaces of the substrate and the catalytic metal, thereby further inhibiting the aggregation of the catalytic metal. In the case where each of the steps (b) to (d) is performed at atmospheric pressure in the hydrogen atmosphere, each of the steps may be performed with hydrogen flowing at a flow rate of, but not limited to, 100 to 1000 mL/min.

In the step (e) of the method for producing a graphene material according to the present invention, examples of the carbon source include hydrocarbons and alcohols each having 1 to 6 carbon atoms. Examples of a method for growing graphene include alcohol chemical vapor deposition (CVD), thermal CVD, plasma-enhanced CVD, and gas source molecular beam epitaxy (MBE).

In the alcohol catalytic CVD, for example, the growth temperature is 400° C. to 1000° C., and the saturated vapor of an alcohol, for example, methanol or ethanol, is supplied as a carbon source. The saturated alcohol vapor may be generated by passing a carrier gas through a bubbler. Examples of the carrier gas that may be used include argon, hydrogen, and nitrogen. The pressure may be atmospheric pressure or reduced pressure.

In the thermal CVD, for example, the growth temperature is 800° C. to 1000° C. For example, methane, ethylene, acetylene, or benzene is supplied as a carbon source. The carbon source is supplied using argon or hydrogen serving as a carrier gas. The partial pressure of the carbon source is, for example, about 0.002 Pa to about 5 Pa. The growth time is, for example, 1 minute to 20 minutes. The pressure may be elevated pressure (for example, 1 kPa) or reduced pressure. To decompose the carbon source, a hot filament is often used.

In the plasma-enhanced CVD, for example, the growth temperature is 950° C. The pressure is 1 Pa to 1.1 Pa. Methane is used as a carbon source. The methane flow rate is 5 sccm. Hydrogen is used as a carrier gas. The hydrogen flow rate is 20 sccm. The plasma power is about 100 W.

In the gas source MBE, for example, ethanol is used as a carbon source. The flow rate of nitrogen or hydrogen gas saturated with ethanol is 0.3 sccm to 2 sccm. To decompose the carbon source in vacuum, a W filament heated to 2000° C. is used. The substrate temperature is about 400° C. to about 600° C.

In the step (f) of the method for producing a graphene material according to the present invention, the graphene may be separated as a graphene material by dissolving the catalytic metal layer. In this case, it is possible to easily separate the graphene material. To dissolve the catalytic metal layer, for example, an acidic solution is used. The type of acidic solution used is determined, depending on the type of metal constituting the catalytic metal layer. For example, when the material of the catalytic metal layer is nickel, dilute nitric acid is used. Alternatively, in order to peel off the graphene material from the catalytic metal layer, for example, only a circumferential portion of the catalytic metal layer may be removed by etching with the acidic solution, and then the graphene material may be mechanically peeled off from the etched portion.

Subsequently, an embodiment of the production of the catalytic metal layer 17 through the steps (a) to (d) and the production of the graphene material 10 through the steps (e) and (f) will be described below with reference to the drawings. FIG. 1 illustrates explanatory drawings (perspective views) of a procedure for producing the catalytic metal layer 17 and the graphene material 10.

In the step (a), a rectangular substrate 12 composed of c-plane sapphire is prepared. Nickel serving as a catalytic metal is deposited on the entirety of an upper surface of the substrate 12 to form a catalytic metal film 14 (see FIG. 1(a)). The catalytic metal film 14 is patterned by a lithography method into a catalytic metal film 16 having a predetermined shape, e.g., a zigzag shape that can be drawn in one stroke (see FIG. 1(b)). The catalytic metal film 16 is formed in such a manner that a portion of the catalytic metal film 16 is juxtaposed to another portion of the catalytic metal film 16 via a part free from the catalytic metal film 16. Specifically, the catalytic metal film 16 is formed so as to have the following structure: A linear section 16a extending from one end is connected to a linear section 16c through a bending section 16b. The linear section 16c is connected to a linear section 16e through a bending section 16d. The linear section 16e is connected to a linear section 16g through a bending section 16f. The linear section 16g is connected to a linear section 16i through a bending section 16h. The linear section 16i is connected to a linear section 16k extending from the other end through a bending section 16j. Gaps are provided between the linear section 16a and the linear section 16c, between the linear section 16c and the linear section 16e, between the linear section 16e and the linear section 16g, between the linear section 16g and the linear section 16i, and between the linear section 16i and the linear section 16k, and the catalytic metal film 16 is not present in each of the gaps.

The catalytic metal film 16 is heat-treated under the temperature conditions according to the steps (b) to (d) to form the catalytic metal layer 17 composed of the crystallized catalytic metal (see FIG. 1(c)). Specifically, in the step (b), the temperature of the catalytic metal film 16 is raised to 1000° C., which is the heating temperature, and maintained at 1000° C. for 20 minutes for annealing. In the step (c), the temperature of the catalytic metal film 16 is lowered from 1000° C. to 800° C. at a rate of 5° C./min. In the step (d), the temperature of the catalytic metal film 16 is maintained at 800° C. for 15 hours. The steps (b) to (d) are performed at atmospheric pressure in a hydrogen atmosphere with hydrogen flowing at a flow rate of 600 mL per minute. Thereby, the catalytic metal film 16 is crystallized to provide the zigzag-shaped catalytic metal layer 17. In the step (b), the upper limit of the low-temperature region is 900° C. because the heating temperature is 1000° C.

In the step (e), C atoms are supplied to Ni constituting the catalytic metal layer 17 with an acetylene-argon gas mixture at a temperature of 600° C. and a pressure of 1 kPa. A triangular lattice including Ni atoms located at vertices is formed on a Ni surface by the crystallization. The supplied C atoms are arranged directly above the barycenter of each of the triangles composed of Ni atoms, thereby forming hexagons in which the C atoms are located at vertices. The hexagons are bonded together to grow graphene (see FIG. 1(d)). Graphene is formed on the catalytic metal layer 17 and thus has the same shape as the catalytic metal layer 17, i.e., the zigzag shape. If graphene is excessively grown, graphene extends laterally to block the gaps included in the zigzag shape. The growth is terminated before it occurs.

Rectangular electrodes 18 and 20 are attached at both ends of the zigzag-shaped graphene (see FIG. 1(e)). The catalytic metal layer 17 is then dissolved with an acidic solution. Here, dilute nitric acid is used because the catalytic metal layer 17 is composed of Ni. After the dissolution of the catalytic metal layer 17, the graphene is separated as the graphene material 10 (see FIG. 1(f)).

The resulting graphene material 10 is a self-supported zigzag-shaped material. It is possible to form a linear-shaped material by holding the electrodes 18 and 20 at both ends and stretching the graphene material 10 (see FIG. 1(g)). The linear-shaped material may be used as a thin electric line through which a high-amperage current flows. A transistor structure may be produced to control the flow of current in the middle portion of the resulting electric line by taking advantage of the properties of the graphene sheet. The term "self-supported" indicates that the material is independent without any support, such as a tape.

The catalytic metal layer 17 has a zigzag shape that can be drawn in one stroke. Thus, even if the substrate 12 has a small area, the length of the resulting graphene material 10 can be extended. The catalytic metal layer 17 is formed in such a manner that a portion of the catalytic metal layer 17 is juxtaposed to another portion of the catalytic metal layer 17 via a part free from the catalytic metal layer 17. Since the portion of the catalytic metal layer 17 is juxtaposed to another portion of the catalytic metal layer 17, when graphene is grown in the step (e), the same growth conditions (for example, the amount of the source material supplied, the temperature, and the flow rate of the carrier gas) can be probably used for the portion and another portion of the catalytic metal layer 17. In the case of producing a long material, such as a linear-shaped material, by holding both ends of the resulting graphene material and stretching the graphene material, it is possible to provide the graphene material having uniform quality in the longitudinal direction because graphene is grown under the same conditions in any position in the longitudinal direction. In contrast, in the case of producing a long material with a linear-shaped catalytic metal layer, graphene can be grown under different conditions at longitudinally different positions to provide a graphene material having nonuniform quality in the longitudinal direction, thereby possibly providing a long graphene material having nonuniform performance and reduced quality.

FIG. 1 illustrates an example of the production of graphene material 10 by forming the zigzag-shaped catalytic metal layer 17 on the rectangular substrate 12. The shapes of the catalytic metal layer 17, the substrate 12, and the graphene material 10 are not limited thereto. For example, the substrate may have a linear or cylindrical shape. The catalytic metal layer may have another shape that can be drawn in one stroke, for example, a spiral shape. Alternatively, the catalytic metal layer may have a shape other than shapes that can be drawn in one stroke. Examples of the shapes that may be used include any shapes, such as polygonal shapes, e.g., triangular and rectangular shapes, circular shapes, elliptic shapes, and star shapes. The catalytic metal film 16 may not be formed in such a manner that a portion of the catalytic metal film 16 is juxtaposed to another portion of the catalytic metal film 16 via a part free from the catalytic metal film 16. In the step (a), the patterning of the catalytic metal film by, for example, a lithography method may not be performed. The catalytic metal layer may have a freely-selected shape. A catalytic metal film having a desired shape may be formed in the step (a), and graphene having a desired shape may be separated as a graphene material in the step (f). The shape of the graphene material is inherited from the shape of the catalytic metal layer. Thus, if the catalytic metal film is only patterned into a desired shape, a graphene material having the desired shape can be obtained. The catalytic metal film may not be formed into a desired shape in the step (a). The catalytic metal layer formed in the step (d) may be processed into a desired shape, and then the steps (e) and (f) may be performed. Also in this case, it is possible to form the graphene material having a desired shape. The step (f) may not be performed. The graphene grown in the step (e) may not be separated from the catalytic metal layer and may be used as a graphene material formed on the catalytic metal layer. That is, the step (e) may be a step of growing graphene by supplying a carbon source to a surface of the catalytic metal layer on the substrate, thereby providing a graphene material, the catalytic metal layer being formed by the foregoing method for producing a catalytic metal layer. Also in this case, if a catalytic metal film having a desired shape is formed in the step (a), the graphene having a desired shape may be provided as a graphene material in the step (e). The graphene material formed on the catalytic metal layer may be used as, for example, an electric wiring or electrode formed on the catalytic metal layer.

When the catalytic metal layer having the linear sections 16a, 16c, 16e, 16g, 16i, and 16k illustrated in FIG. 1 or a linear shape, such as a stripe shape, is formed in the steps (a) to (d), ridged structures (bank structure) are formed at both edges (edge portions) of the catalytic metal layer. Ridged portions each have a height of, for example, about 1 μm. FIG. 2 illustrates explanatory drawings of the bank structure of the catalytic metal layer. FIG. 2(a) is a top view. FIG. 2(b) is a cross-sectional view taken along line A-A in FIG. 2(a). As illustrated in FIG. 2(b), portions of the graphene formed on the bank structures have curvatures that reflect the ridged portions of the catalytic metal. The catalytic metal layer is thick in the portions. Thus, a greater amount of carbon is dissolved during the growth of graphene, so that thicker portions of graphene are grown. The portions have a carrier potential different from a flat portion located at the central portion of the catalytic metal stripe. The effect of the potential permits a current flowing through the graphene stripe to flow mainly through the central portion of the stripe. This advantageously improves the electrical conduction properties of the graphene. The reason for this is that the conduction properties of the graphene stripe at the edges (side portions) are not always satisfactory. Portions where graphene is terminated are present at the edges of the graphene stripe. In the portions, the bonds are cleaved to form dangling bonds. As a result, the periodic structure of the crystal is disordered, thereby degrading the conduction properties of graphene. In the bank portions, the flatness of the catalytic metal layer is poor. Thus, the graphene layer grown has defects, poor crystallinity, deep levels, and recombination centers. They serve also as factors that degrade the conduction properties. For this reason, as described above, the concentration of the electrical conduction in the central portion of the graphene stripe provides the effect of improving the conduction properties.

In the method for producing a catalytic metal layer according to the present invention, the catalytic metal formed on the substrate is subjected to heat treatment under the conditions described in the steps (b) to (d), so that the occurrence of the aggregation of the catalytic metal is inhibited, thus producing the catalytic metal layer having large grains. The reason the effect is provided is unclear but is speculated as follows.

In the step (b), the temperature of the catalytic metal is raised to the heating temperature in the high-temperature region where a high affinity between the catalytic metal and the substrate is achieved. The rise in temperature to the high-temperature region presumably results in aid to the arrangement of the atoms of the catalytic metal, thereby facilitating the crystallization in the step (d).

In the step (c), the temperature of the catalytic metal is lowered from the heating temperature to the low-temperature region where a misfit dislocation is introduced between the substrate and the catalytic metal. Here, the decrease in temperature causes tensile stress in the catalytic metal because of a difference in thermal expansion coefficient between the catalytic metal and the substrate, thereby possibly forming a crack at the boundary between adjacent grains of the catalytic metal. The crack promotes the aggregation of the catalytic metal. However, in the case where the temperature is further lowered, when the temperature is relatively lowered from a temperature from which the decrease in temperature starts, i.e., the heating temperature in the step (b), by a certain temperature, the stress in the catalytic metal exceeds the critical value for the introduction of the misfit dislocation. As a result, the misfit dislocation is introduced between the substrate and the catalytic metal to relieve the stress in the catalytic metal. Thus, the occurrence of a new cracking is inhibited in a state in which the temperature is lowered to the low-temperature region where the misfit dislocation is introduced. A region with a temperature lower than the heating temperature and higher than the low-temperature is defined as an intermediate-temperature region. In the step (c), the temperature is lowered so as to satisfy at least one of the first requirement in which the temperature is lowered at a rate of temperature decrease of 2° C./min or more while the temperature of the catalytic metal is in the intermediate-temperature region, and the second requirement in which the temperature is lowered in such a manner that the length of time that the temperature of the catalytic metal is in the intermediate-temperature region is within 50 minutes. Thus, the temperature of the catalytic metal passes through the intermediate-temperature region before the grains of the catalytic metal extend to come into contact with each other, i.e., in a state in which no grain boundaries are present. Alternatively, even if a grain boundary is present, the temperature of the catalytic metal passes through the intermediate-temperature region before the grain boundary cracks. This presumably results in the inhibition of the occurrence of the aggregation. The reason the crack formed at the grain boundary of the catalytic metal promotes the aggregation is speculated as follows. The formation of a crack results in the exposure of a surface of the substrate. As a result, the catalytic metal aggregates to reduce the surface area of the catalytic metal and the interfacial area between the catalytic metal and the substrate. Here, in the case where the sum of the surface energy of the catalytic metal and the interfacial energy between the catalytic metal and the substrate is larger than the surface energy of the substrate, even if the surface energy is added by the extension of the substrate surface, the sum total of the surface energies of the substrate and the catalytic metal and the interfacial energy between the catalytic metal and the substrate is reduced, which is energetically favorable. It is thus speculated that the catalytic metal can continue to aggregate.

In the step (d), the catalytic metal is crystallized into the catalytic metal layer in the state in which the temperature of the catalytic metal is a temperature equal to or lower than the upper limit of the low-temperature region. At the temperature equal to or lower than the upper limit of the low-temperature region, as described above, the misfit dislocation is introduced between the substrate and the catalytic metal to relieve the stress in the catalytic metal, thereby inhibiting the occurrence of a new cracking. The crystallization of the catalytic metal in this state presumably results in the extension of the grains while the occurrence of the aggregation is inhibited.

A mechanism for the extension of the grains in the step (d) is speculated as follows. The catalytic metal is crystallized to form grains, which are small single-crystal regions, the grains reflecting the crystallinity of the substrate. Thus, there is basically no contradiction if the entire surface of the substrate is covered with single-domain grains of the catalytic metal. However, a plurality of crystal nuclei of the catalytic metal are usually formed on the substrate. A very small number of grains nuclei can be generated only at edge portions of the substrate, depending on conditions. Typically, a large number of crystal nuclei are generated over the entire surface of the substrate. This difference depends on the driving force (the degree of supersaturation) of the solid-phase epitaxial growth of the catalytic metal (the crystallization of the catalytic metal is attributable to the solid-phase epitaxial growth). A high driving force results in the generation of a large number of nuclei. A low driving force fails to generate uniform nuclei. Only heterogeneous nuclei are generated at, for example, the edge portions of the substrate. In this experiment, the driving force is believed to be generated, depending on the rate of temperature decrease of the substrate. Thus, when the substrate is maintained at a constant temperature, the driving force is substantially zero. Thus, a new nucleus is less likely to be generated. Even in this case, at portions, such as the edges of the substrate where a nucleus is significantly easily generated, a heterogeneous nucleus can be barely generated and can serve as the starting point of the grain formation of the catalytic metal. When a certain rate of temperature decrease is maintained, the driving force continues to be generated, so that new nuclei continue to be generated. Here, a higher rate of temperature decrease results in a higher driving force, so that a larger number of nuclei are generated. In the case where a hole is formed by cracking at a grain boundary of the catalytic metal, when the temperature of the catalytic metal is in the intermediate-temperature region, the interfacial energy between the catalytic metal and the substrate is large because of thermal expansion strain, and the sum of the interfacial energy and the surface energy of the catalytic metal is always larger than the surface energy of the substrate, so that the aggregation of the catalytic metal proceeds. In the low-temperature region, the formation of a new crack is inhibited. However, the sum of the surface energy of the catalytic metal and the interfacial energy between the catalytic metal and the substrate is larger than the surface energy of the substrate. Thus, in the case where cracking has already occurred because of the temperature decrease in the step (c), the aggregation of the catalytic metal proceeds in the same way as the intermediate-temperature region. In the case where no cracking occurs during the temperature decrease in the step (c) and where the temperature of the catalytic metal reaches the low-temperature region, the occurrence of the aggregation is inhibited because the formation of a new crack is inhibited in the step (d), so that the extension of the grains proceeds. Let us now consider the case where a hole due to cracking is not present and where a large number of small grains are in contact with a single large grain. In this case, the single large grain located at an edge of the substrate or located even in the central portion of the substrate is believed to be crystallized, the grain reflecting the crystal information of the surface of the substrate. This is because the interfacial energy is reduced when the crystal orientation of the grain is matched with the crystal orientation of the substrate. In contrast, in a large number of grains, although some grains reflect the crystal information of the surface of the substrate, others do not reflect the crystal information. Here, when heat treatment is performed, it is common for the large grain to absorb adjacent grains to grow. This phenomenon is referred to as "Ostwald ripening". This phenomenon is caused by the fact that the total energy is more stable when the grain boundary disappears to extend the grain because a grain boundary is an energetically unstable place. In this case, as described above, the grain that maintains the epitaxial relationship with the substrate, i.e., the catalytic metal grain that reflects the crystal orientation of the surface of the substrate, has a lower grain energy. Thus, in the case where the large grain is bonded to an adjacent grain during the heat treatment, the adjacent grain is changed so as to have an orientation that reflects the crystal orientation of the surface of the substrate, i.e., the adjacent grain is changed so as to have the same orientation as the large grain and is bonded to form a single domain, which is energetically stable. It is believed that the domain size increases with time during the heat treatment by the foregoing mechanism.

In the step (c), when the rate of temperature decrease in the first requirement is set at 3° C./min or more, the temperature of the catalytic metal more rapidly reaches the low-temperature region, thereby further inhibiting the occurrence of the aggregation. When the rate of temperature decrease is set at 20° C./min or less, the generation of a large number of grain nuclei in the catalytic metal can be inhibited, thus inhibiting the formation of a large number of small grains. For example, it is possible to reduce the time required to bond the grains together.

In the step (d), when the catalytic metal is crystallized with the temperature maintained at a temperature of (the upper limit of the low-temperature region—150)° C. or higher, it is possible to provide the catalytic metal layer having large grains in a relatively short time.

The graphene material is produced in the steps (e) and (f) with the catalytic metal layer having large grains produced in the steps (a) to (d), thereby resulting in the large-area graphene material.

EXAMPLES

Experimental Example 1

An example in which a catalytic metal layer was specifically formed is described as Experimental Example 1. In a step (a), Ni serving as a catalytic metal film was deposited by an electron beam evaporation method on a c-plane sapphire substrate having a thickness of 350 µm and a surface size of 10 mm×10 mm. The resulting catalytic metal (Ni) film had a thickness of 220 nm to 250 nm. Subsequently, heat treatments in steps (b) to (d) were performed at atmospheric pressure in a hydrogen atmosphere at different temperatures. For the heat treatments, an electric furnace was used. The Ni-deposited c-plane sapphire was placed in a reaction tube installed in the electric furnace. The heat treatments were performed with hydrogen flowing through the reaction tube at a flow rate of 600 mL/min. In the step (b), the temperature of Ni was raised to 1000° C. at 30° C./min. Then Ni was maintained at 1000° C. for 20 minutes. In the step (c), the rate of temperature decrease of the electric furnace was set at 5° C./min. The temperature of Ni was lowered from 1000° C. to 800° C. In the step (d), the temperature was maintained at 800° C. for 5 hours. The Ni-deposited c-plane sapphire was rapidly cooled to room temperature and removed from the furnace, thereby providing a catalytic metal layer according to Experimental Example 1. FIG. 3 illustrates photomicrographs of a surface of the catalytic metal layer according to Experimental Example 1. Each of the photomicrographs is obtained by photographing an image observed with a Nomarski interference microscope. The same is true of photomicrographs in the subsequent Experimental Examples.

Experimental Example 2

A catalytic metal layer according to Experimental Example 2 was produced as in Experimental Example 1, except that the temperature was maintained at 800° C. for 10 hours in the step (d). FIG. 4(a) is an explanatory drawing of a surface of the catalytic metal layer according to Experimental Example 2. FIGS. 4(b) and 5 are photomicrographs of the surface of the catalytic metal layer according to Experimental Example 2. In FIG. 4(a), among grains formed on the surface of the catalytic metal layer, particularly large grains are expressed as regions filled in with a deep color. As is clear from the drawing, the grains are grown from edge portions of the catalytic metal layer. Regions (1) to (9) in FIG. 4(a) indicate positions of 9 regions into which the catalytic metal layer was divided. FIG. 4(b) is a photomicrograph of the region (8). FIG. 5(a) is a photomicrograph of the region (4). FIG. 5(b) is a photomicrograph of the region (5).

Experimental Example 3

A catalytic metal layer according to Experimental Example 3 was produced as in Experimental Example 1, except that the temperature was raised to 1000° C. and then maintained at 1000° C. for 40 minutes in the step (b) and that the temperature was maintained at 800° C. for 15 hours in the step (d). FIG. 6(a) is an explanatory drawing of a surface of the catalytic metal layer according to Experimental Example 3. FIGS. 6(b), 7, and 8 are photomicrographs of a surface of the catalytic metal layer according to Experimental Example 3. In the catalytic metal layer according to Experimental Example 3, among grains formed on the surface of the catalytic metal layer, three particularly large grains are formed by growth from edges of the catalytic metal layer. In FIG. 6(a), the three large grains are illustrated as regions (1) to (3). One large grain is formed by growth from the center (portion other than the edge portions) of the catalytic metal layer. In FIG. 6(a), the large grain is illustrated as region (4). FIG. 6(b) is a photomicrograph of the grain in the region (1). FIG. 7(a) is a photomicrograph of the grain in the region (2). FIG. 7(b) is a photomicrograph of the grain in the region (3). FIG. 8(a) is a photomicrograph of the grain in the region (4). FIG. 8(b) is a photomicrograph of the grain in the region (2).

Experimental Example 4

A catalytic metal layer according to Experimental Example 4 was produced as in Experimental Example 1, except that the temperature of Ni was lowered from 1000° C. to 900° C. or lower, which is the upper limit of the low-temperature region, at a set rate of temperature decrease of 5° C./min in the step (c) and that subsequently, the temperature of Ni continued to be lowered to 500° C. at the same rate of temperature decrease of 5° C./min in the step (d). FIG. 9 illustrates photomicrographs of a surface of the catalytic metal layer according to Experimental Example 4. The average grain area was calculated from the photomicrograph in FIG. 9(a) and found to be 463 μm². The average grain area was calculated as described below. In the photomicrograph, three longitudinal lines and three lateral lines were evenly drawn. The number of grains on the lines was counted. Next, the average grain size was calculated from (line length/number of grains) for each line. The average grain area was calculated from (the average of the average grain sizes of the three longitudinal lines)×(the average of the average grain sizes of the three lateral lines).

Experimental Example 5

Figure 10:
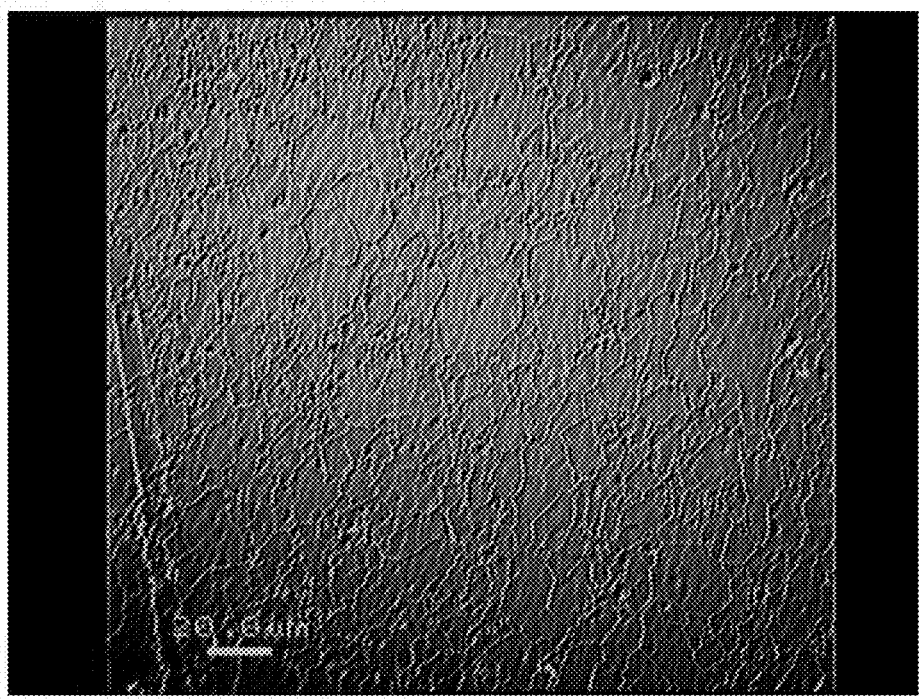
FIG. 10 illustrates photomicrographs of a surface of a catalytic metal layer according to Experimental Example 5.

A catalytic metal layer according to Experimental Example 5 was produced as in Experimental Example 4, except that the rate of temperature decrease was set at 7° C./min in the steps (c) and (d). FIG. 10 is a photomicrograph of a surface of the catalytic metal layer according to Experimental Example 5.

Experimental Example 6

Figure 11:
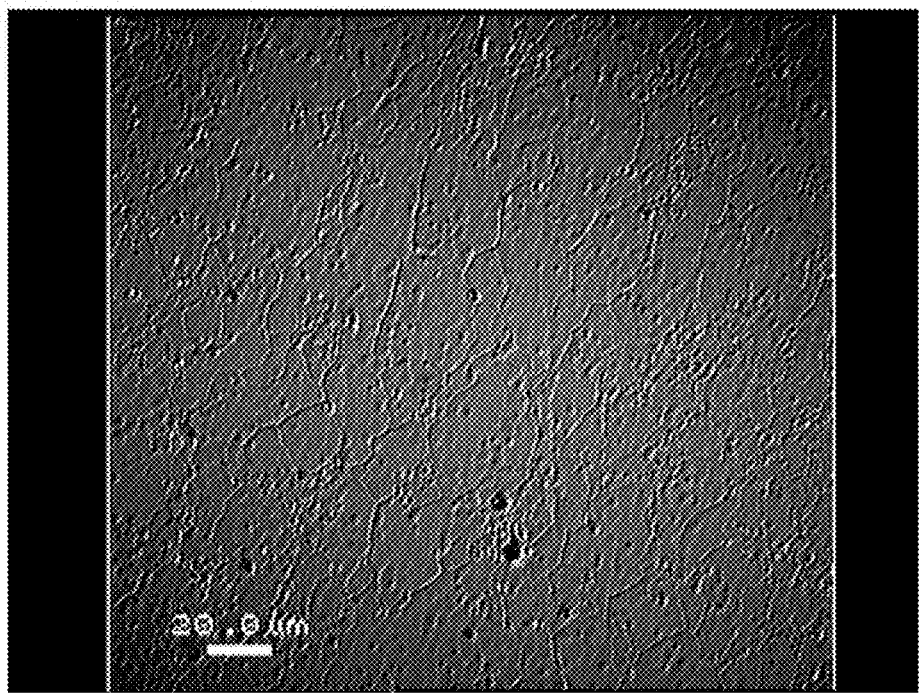
FIG. 11 illustrates photomicrographs of a surface of a catalytic metal layer according to Experimental Example 6.

A catalytic metal layer according to Experimental Example 6 was produced as in Experimental Example 4, except that the rate of temperature decrease was set at 10° C./min in the steps (c) and (d). FIG. 11 is a photomicrograph of a surface of the catalytic metal layer according to Experimental Example 6.

Experimental Example 7

Figure 12:
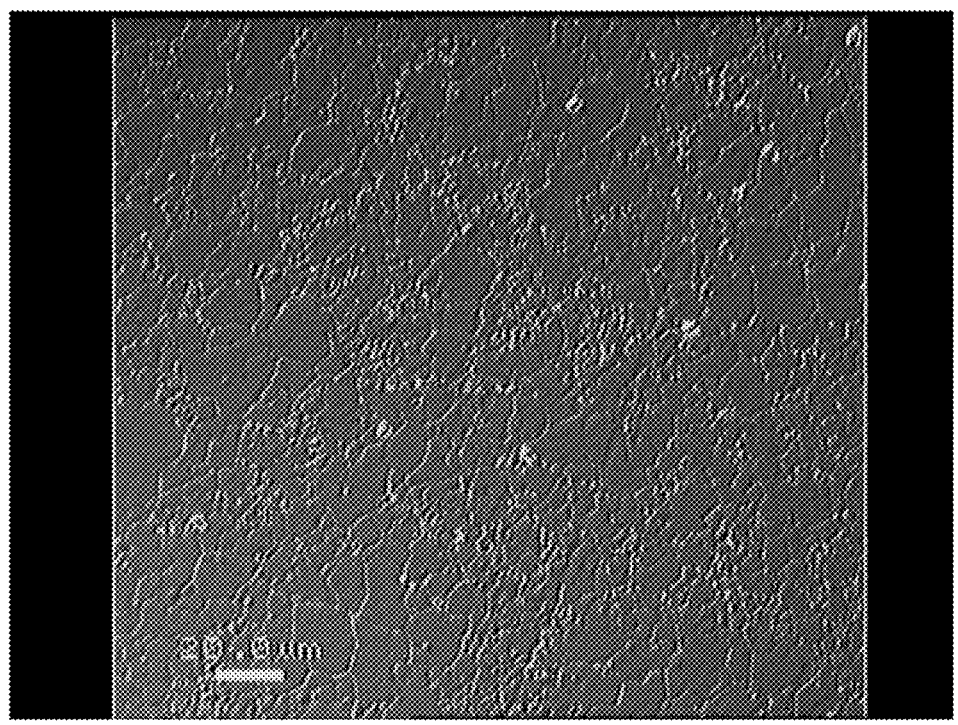
FIG. 12 illustrates photomicrographs of a surface of a catalytic metal layer according to Experimental Example 7.

A catalytic metal layer according to Experimental Example 7 was produced as in Experimental Example 4, except that the rate of temperature decrease was set at 20° C./min in the steps (c) and (d). FIG. 12 is a photomicrograph of a surface of the catalytic metal layer according to Experimental Example 7.

Experimental Example 8

Figure 13:
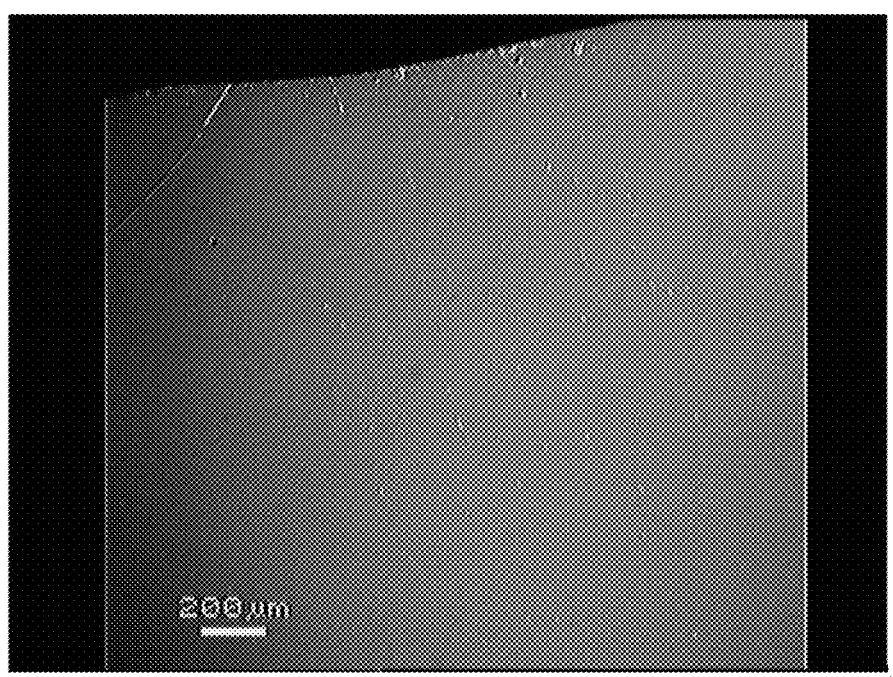
FIG. 13 illustrates photomicrographs of a surface of a catalytic metal layer according to Experimental Example 8.

A catalytic metal layer according to Experimental Example 8 was produced as in Experimental Example 4, except that the rate of temperature decrease was set at 3° C./min in the steps (c) and (d). FIG. 13 is a photomicrograph of a surface of the catalytic metal layer according to Experimental Example 8.

Experimental Example 9

A catalytic metal layer according to Experimental Example 9 was produced as in Experimental Example 1, except that the temperature of Ni was lowered from 1000° C. to 900° C. at a set rate of temperature decrease of 5° C./min in the step (c) and that the temperature was maintained at 900° C. for 15 hours in the step (d). FIG. 14 illustrates photomicrographs of a surface of the catalytic metal layer according to Experimental Example 9.

Experimental Example 10

A catalytic metal layer according to Experimental Example 10 was produced as in Experimental Example 1, except that the temperature of Ni was lowered from 1000° C. to 900° C. or lower, which is the upper limit of the low-temperature region, at a set rate of temperature decrease of 1° C./min in the step (c) and that subsequently, the temperature of Ni continued to be lowered to 500° C. at the same rate of temperature decrease of 1° C./min in the step (d). FIG. 15 illustrates photomicrographs of a surface of the catalytic metal layer according to Experimental Example 10.

Experimental Example 11

Figure 16:
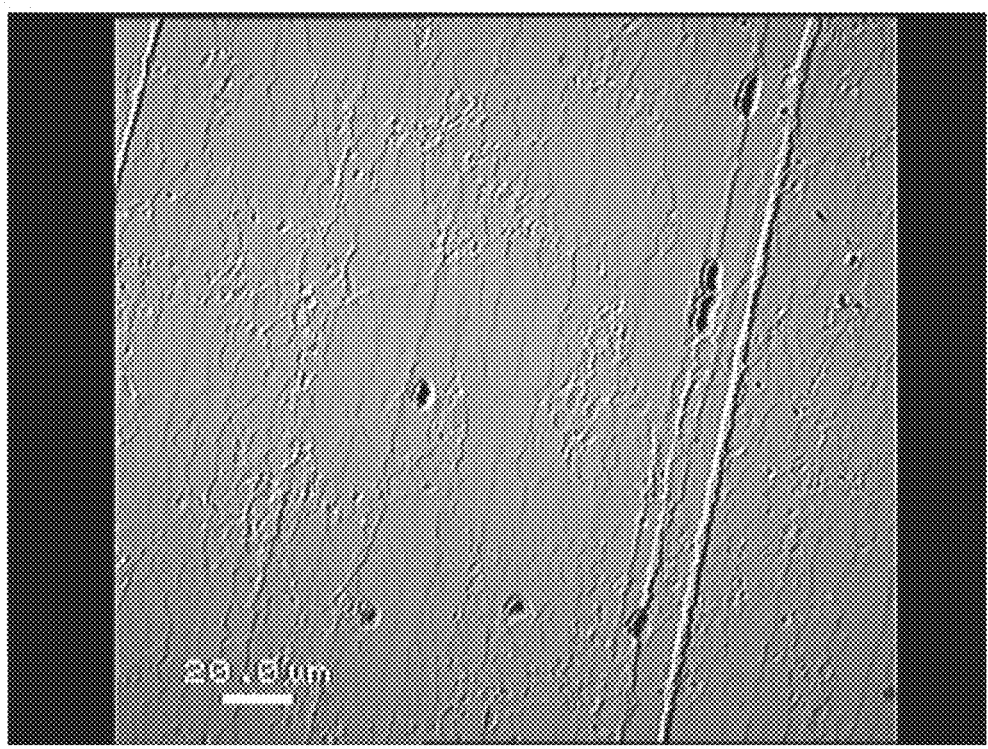
FIG. 16 illustrates photomicrographs of a surface of a catalytic metal layer according to Experimental Example 11.

A catalytic metal layer according to Experimental Example 11 was produced as in Experimental Example 1, except that the temperature of Ni was lowered from 1000° C. to 800° C. at a set rate of temperature decrease of 1° C./min in the step (c) and that the temperature was maintained at 800° C. for 1 hour in the step (d). FIG. 16 is a photomicrograph of a surface of the catalytic metal layer according to Experimental Example 11.

Experimental Example 12

A catalytic metal layer according to Experimental Example 12 was produced as in Experimental Example 1, except that the temperature of Ni was lowered from 1000° C. to 900° C. or lower, which is the upper limit of the low-temperature region, at a set rate of temperature decrease of 1° C./min in the step (c) and that subsequently, the temperature of Ni continued to be lowered to 630° C. at the same rate of temperature decrease of 1° C./min in the step (d). FIG. 17 illustrates photomicrographs of a surface of the catalytic metal layer according to Experimental Example 12. The average grain area was calculated from the photomicrograph in FIG. 17(a) in the same way as in Experimental Example 4 and found to be 305 µm².

Experimental Example 13

Figure 18:
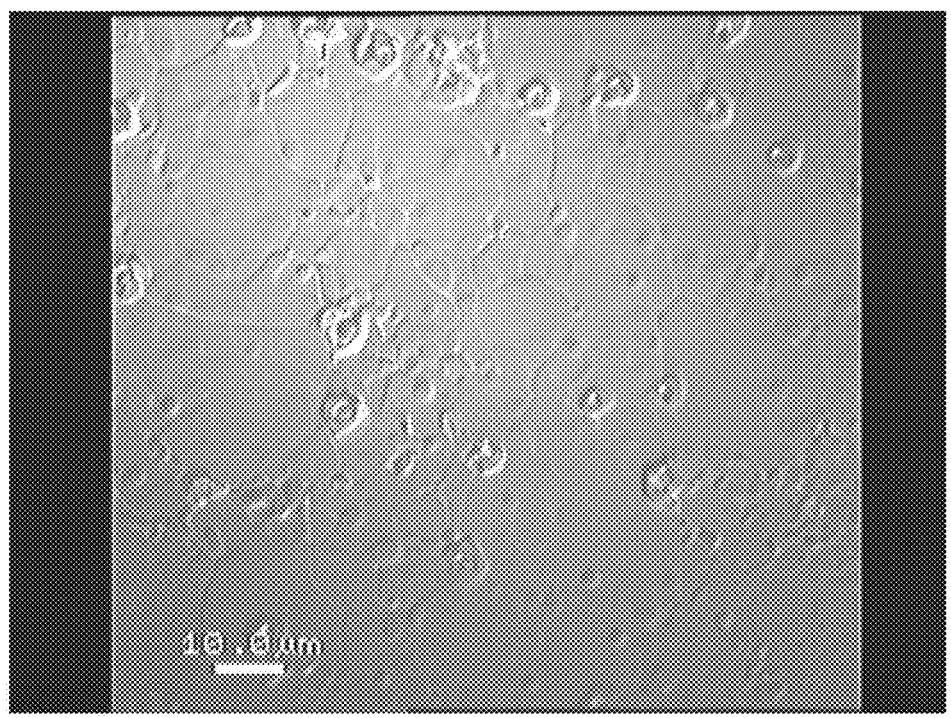
FIG. 18 illustrates photomicrographs of a surface of a catalytic metal layer according to Experimental Example 13.

A catalytic metal layer according to Experimental Example 13 was produced as in Experimental Example 12, except that in the step (d), the temperature of Ni continued to be lowered to 750° C. at the same rate of temperature decrease of 1° C./min as the step (c). FIG. 18 is a photomicrograph of a surface of the catalytic metal layer according to Experimental Example 13. The average grain area was calculated from the photomicrograph in FIG. 18 in the same way as in Experimental Example 4 and found to be 86.8 µm².

Experimental Example 14

Figure 19:
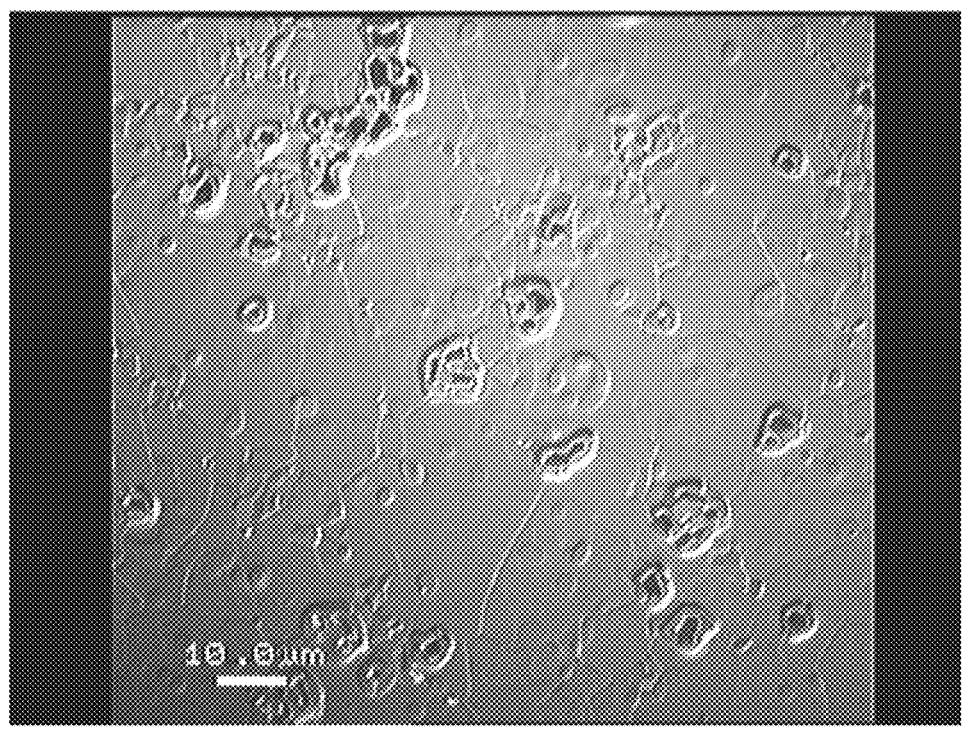
FIG. 19 illustrates photomicrographs of a surface of a catalytic metal layer according to Experimental Example 14.

A catalytic metal layer according to Experimental Example 14 was produced as in Experimental Example 12, except that in the step (d), the temperature of Ni continued to be lowered to 800° C. at the same rate of temperature decrease of 1° C./min as the step (c). FIG. 19 is a photomicrograph of a surface of the catalytic metal layer according to Experimental Example 14. The average grain area was calculated from the photomicrograph in FIG. 19 in the same way as in Experimental Example 4 and found to be 40.4 µm².

In Experimental Examples 1 to 4 and 9 in which the rate of temperature decrease was set at 5° C./min, in fact, a change in the temperature of the electric furnace did not follow the set rate. Regarding the actual rate of temperature decrease, the fastest rate was observed for 5 minutes after the initiation of the temperature decrease. The rate of temperature decrease tended to decrease with time. In the case where the rate of temperature decrease was set at 5° C./min, the rate of temperature decrease for the length of time required for the temperature of the catalytic metal to drop from 1000° C. to 900° C. (the upper limit of the low-temperature region) in the step (c) was calculated on the basis of the actual change in temperature every 5 minutes. As a result, the rate of temperature decrease was in the range of 3.2° C./min to 5.0° C./min. Also in Experimental Examples 5, 6, and 7 in which the rates of temperature decrease were set to 7° C./min, 10° C./min, and 20° C./min, respectively, the same tendency was observed. The rates of temperature decrease for the lengths of time required for the temperature of the catalytic metals to drop from 1000° C. to 900° C. (the upper limit of the low-temperature region) in the step (c) were in the ranges of 3.8° C./min to 5.0° C./min, 3.6° C./min to 5.6° C./min, and 3.7° C./min to 5.8° C./min, respectively. The length of time required for the temperature of each catalytic metal to drop from 1000° C. to 900° C. (time required to reach the low-temperature region) in the step (c) was about 22 minutes in each of Experimental Examples 1 to 7 and 9. The lengths of time required for the temperature of the catalytic metals to drop from 1000° C. to 800° C. in the step (c) were about 50 minutes for each of Experimental Examples 1 to 4 and 9, and about 52 minutes for each of Experimental Examples 5 to 7. In Experimental Examples 4 to 6, the actual rate of temperature decrease was 3° C./min or less for the length of time required for the temperature of each catalytic metal to drop from 800° C. to 500° C. The length of time required for the temperature of each catalytic metal to drop from 1000° C. to 500° C. was about 210 minutes. In Experimental Example 8 in which the rate of temperature decrease was set at 3° C./min and in Experimental Examples 10 to 14 in which the rate of temperature decrease was set at 1° C./min, the actual rate of temperature decrease was equal to the set rate of temperature decrease. The lengths of time required for the temperature of the catalytic metals to drop from 1000° C. to 900° C. in the step (c) were about 33 minutes and about 100 minutes, respectively. However, in Experimental Example 8 in which the set rate was 3° C./min, the rate of temperature decrease for the length of time required for the temperature of the catalytic metal to drop from 800° C. to 500° C. was 3° C./min or less as with Experimental Examples 4 to 6.

Table 1 summarizes the heat treatment conditions in Experimental Examples 1 to 14 and the average grain areas calculated in Experimental Examples 4 and 12 to 14. Experimental Examples 1 to 9 correspond to examples. Experimental Examples 10 to 14 correspond to comparative examples.

TABLE 1

| | Step (b) | | Step (c) | | | | Average |
| | | | | | | | grain |
| | Heating | Holding | Rate of | Temperature at temperature | Time required to reach low- | | area |
| Experimental | temperature | time | temperature decrease | decrease terminated | temperature region | Step (d) | |
| Example | (° C.) | (min) | (° C./min) | (° C.) | (min) | Heat treatment condition | (µm²) |
|---|---|---|---|---|---|---|---|
| 1 | 1000 | 20 | 5(3.2~5.0) ※1 | 800 | 22 | Maintained at 800° C. for 5 h | |
| 2 | 1000 | 20 | 5(3.2~5.0) ※1 | 800 | 22 | Maintained at 800° C. for 10 h | |

TABLE 1-continued

| | Step (b) | | Step (c) | | | | |
| --- | --- | --- | --- | --- | --- | --- | --- |
| Experimental Example | Heating temperature (° C.) | Holding time (min) | Rate of temperature decrease (° C./min) | Temperature at temperature decrease terminated (° C.) | Time required to reach low-temperature region (min) | Step (d) Heat treatment condition | Average grain area (μm²) |
| 3 | 1000 | 40 | 5(3.2~5.0) ※1 | 800 | 22 | Maintained at 800° C. for 15 h | |
| 4 | 1000 | 20 | 5(3.2~5.0) ※1 | — | 22 | Lowered to 500° C. at 5° C./min | 463 |
| 5 | 1000 | 20 | 7(3.8~5.0) ※1 | — | 22 | Lowered to 500° C. at 7° C./min | |
| 6 | 1000 | 20 | 10(3.6~5.6) ※1 | — | 22 | Lowered to 500° C. at 10° C./min | |
| 7 | 1000 | 20 | 20(3.7~5.8) ※1 | — | 22 | Lowered to 500° C. at 20° C./min | |
| 8 | 1000 | 20 | 3 | — | 33 | Lowered to 500° C. at 3° C./min | |
| 9 | 1000 | 20 | 5(3.2~5.0) ※1 | 900 | 22 | Maintained at 900° C. for 15 h | |
| 10 | 1000 | 20 | 1 | — | 100 | Lowered to 500° C. at 1° C./min | |
| 11 | 1000 | 20 | 1 | 800 | 100 | Maintained at 800° C. for 1 h | |
| 12 | 1000 | 20 | 1 | — | 100 | Lowered to 630° C. at 1° C./min | 305 |
| 13 | 1000 | 20 | 1 | — | 100 | Lowered to 750° C. at 1° C./min | 86.8 |
| 14 | 1000 | 20 | 1 | — | 100 | Lowered to 800° C. at 1° C./min | 40.4 |

※1: These values are expressed as "the set rate of temperature decrease (the actual rate of temperature decrease for the length of time required to reach the low-temperature region)".

In the photomicrographs in FIGS. 3 to 19, portions that appear to be mesh-like lines are grain boundaries. Portions that appear to be black spots are portions where the surface of the sapphire substrate is exposed, i.e., portions where the aggregation occurred. Comparison of FIGS. 3 to 14 with FIGS. 15 to 19 reveals that in Experimental Examples 1 to 9 in which the rates of temperature decrease were set at 2° C. or more and which satisfy the first requirement, the occurrence of the aggregation was inhibited, and the Ni grains were large, compared with Experimental Examples 10 to 14 in which the rate of temperature decrease was set at 1° C./min. The calculated average grain size in Experimental Example 4 was larger than those of Experimental Examples 12 to 14. In each of Experimental Examples 1 to 9, the length of time that the temperature of Ni is in the intermediate-temperature region (higher than 900° C. and less than 1000° C.) in the step (c) is within 50 minutes, so that the second requirement is also satisfied. In contrast, Experimental Examples 10 to 14 satisfy neither the first requirement nor the second requirement.

In FIG. 3(b), the bunched atomic steps (a plurality of thin streak-like patterns extending in the vertical direction of the drawing) is observed on the Ni surface. The results clearly demonstrate that a plurality of regions surrounded by the mesh-like lines in FIG. 3(b) serve as individual grains. Similarly, in each of FIGS. 5(a) and 6(b), the bunched atomic steps (a plurality of thin streak-like patterns extending from the upper-right portion to the lower-left portion of the drawing) is observed in an upper region of the drawing. The results clearly demonstrate that the region serves as a single large grain. In FIG. 7(a), the bunched atomic steps (a plurality of thin streak-like patterns extending from the upper-right portion to the lower-left portion of the drawing) is observed in a region of the drawing excluding the upper-left portion and the upper-right portion of the drawing. The results clearly demonstrate that the region serves as a single large grain. In FIG. 8(a), the bunched atomic steps (a plurality of thin streak-like patterns extending from the upper-right portion to the lower-left portion of the drawing) is observed in a region of the drawing excluding the upper-left portion of the drawing. The results clearly demonstrate that the region serves as a single large grain.

In FIGS. 15 to 19, most of the black spots are located along the grain boundaries. The aggregation is found to be liable to occur at the grain boundaries. The results are in agreement with the foregoing mechanism in which the decrease in temperature causes tensile stress in the catalytic metal because of a difference in thermal expansion coefficient between the catalytic metal and the substrate, thereby possibly forming a crack at the boundary between adjacent grains of the catalytic metal, so that the crack promotes the aggregation of the catalytic metal.

Comparison of FIG. 8(b) which is a photomicrograph according to Experimental Example 3 with FIG. 14 which illustrates photomicrographs according to Experimental Example 9 reveals that although large grains are formed in both drawings, the aggregation occurs partially in FIG. 14. In Experimental Examples 3 and 9, the same heat treatment conditions are employed, except that after the decrease in temperature is stopped in the step (c), the temperature is maintained at 800° C. or 900° C. The results suggested that the upper limit of the low-temperature region, at which a misfit dislocation is introduced by a decrease in temperature to inhibit the occurrence of the aggregation, is 900° C. Note that in Experimental Example 9 in which the temperature was maintained at 900° C., the extension of the grains proceeded regardless of the same holding time.

Comparisons of Experimental Examples 1 to 3 in which the temperature was maintained at 800° C. in the step (d) with Experimental Example 4 in which the decrease in temperature was continued to 500° C. in the step (d) reveal that as is clear from the comparisons of FIGS. 3 to 8 with FIG. 9, larger grains are formed in Experimental Examples 1 to 3. In Experimental Examples 1 to 3, the temperature is maintained at 800° C., which is higher than (the upper limit of the low-temperature region—150)° C. (=750° C.). Thus, the growth rate of grains is high, compared with Experimental Example 4. Thereby, the catalytic metal layer having large grains is provided in a relatively short time.

Comparisons of Experimental Examples 1 to 3 in which the production was performed under the same heat-treatment conditions, except that different holding times at 800° C. in the step (d) were used, reveal that as is clear from FIGS. 3 to 8, a longer holding time permits the extension of grains to proceed to form larger grains. In particular, in Experimental Example 3 in which the holding time was 15 hours, the photomicrograph in FIG. 8(b) reveals that a very large grain of the order of millimeters is provided. FIG. 6(b) clearly reveals a boundary where fine grains are bonded together into a single domain.

As is apparent from FIGS. 4(a) and 6(a), the large grains are found to be easily grown from the edge portion of Ni. Thus, regarding the shape of the catalytic metal film formed in the step (a), the catalytic metal layer having large grains is easily produced in a shape, such as a linear shape or a zigzag shape, in which a region of the catalytic metal film remote from all edge portions is relatively small, compared with a shape, such as a square, in which a region of the catalytic metal film remote from all edge portions is relatively large.

Comparisons of Experimental Examples 12 to 14 reveal that a lower target temperature of Ni in the step (d) (the target temperatures in Experimental Examples 12, 13, and 14 were 630° C., 750° C., and 800° C., respectively) resulted in a larger average grain area. The reason for this is presumably that in Experimental Examples 12 to 14, the same rate of temperature decrease was used and thus a lower target temperature resulted in a longer time required to reach the target temperature, i.e., a longer heat-treatment time, so that the grains were extended during the time. In each of Experimental Examples 12 to 14, however, a large number of aggregations were generated in the resulting catalytic metal layer composed of Ni, which was inappropriate for the production of a graphene material. In FIG. 17(a) which is a photomicrograph in Experimental Example 12, not-so-many aggregations were observed. In other portions of Ni according to Experimental Example 12, for example, in FIG. 17(b), a large number of aggregations were generated.

The present application claims priority from Japanese Patent Application No. 2012-040554 filed on Feb. 27, 2012, the entire contents of which are incorporated in the present specification by reference.

INDUSTRIAL APPLICABILITY

The method for producing a catalytic metal of the present invention may be used for, for example, the production of the graphene material for use in transistors and electrical wiring.

REFERENCE SIGNS LIST 10 graphene material, 12 substrate, 14 catalytic metal film, 16 catalytic metal film, 16a, 16c, 16e, 16g, 16i, 16k linear section, 16b, 16d, 16f, 16h, 16j bending section, 17 catalytic metal layer, 18, 20 electrode

The invention claimed is:

1. A method for producing a catalytic metal layer, comprising the steps of:
   (a) forming a film composed of a catalytic metal on a substrate, the catalytic metal having the function of promoting graphenization;
   (b) raising the temperature of the catalytic metal to a heating temperature in a high-temperature region where a high affinity between the catalytic metal and the substrate is achieved;
   (c) lowering the temperature of the catalytic metal from the heating temperature to a low-temperature region where a misfit dislocation is introduced between the substrate and the catalytic metal, and lowering the temperature of the catalytic metal so as to satisfy at least one of a first requirement in which the temperature of the catalytic metal is lowered at a rate of temperature decrease of 2° C./min or more while the temperature of the catalytic metal is in an intermediate-temperature region having a temperature lower than the heating temperature and higher than the low-temperature, and a second requirement in which the temperature of the catalytic metal is lowered in such a manner that the length of time that the temperature of the catalytic metal is in the intermediate-temperature region is within 50 minutes; and
   (d) crystallizing the catalytic metal into a catalytic metal layer while the temperature of the catalytic metal is a temperature equal to or lower than the upper limit of the low-temperature region.

2. The method for producing a catalytic metal layer according to claim 1,
   wherein in the step (c), the rate of temperature decrease is 3° C./min or more and 20° C./min or less.

3. The method for producing a catalytic metal layer according to claim 1,
   wherein in the step (d), the catalytic metal is crystallized with the temperature maintained at a temperature of (the upper limit of the low-temperature region—150) ° C. or higher.

4. The method for producing a catalytic metal layer according to claim 1,
   wherein each of the steps (b) to (d) is performed at atmospheric pressure in a hydrogen atmosphere, at atmospheric pressure in an inert atmosphere, or in a vacuum atmosphere.

5. The method for producing a catalytic metal layer according to claim 1,
   wherein the catalytic metal is nickel,
   the substrate is a sapphire substrate,
   in the step (b), the temperature of the catalytic metal is raised to the heating temperature in a region having a temperature of 900° C. or higher and 1400° C. or lower, the region serving as the high-temperature region, and
   in the step (c), the temperature of the catalytic metal is lowered from the heating temperature to a temperature of (the heating temperature—100° C. or lower serving as the upper limit of the low-temperature region, and the temperature of the catalytic metal is lowered so as to satisfy at least one of the first requirement in which the temperature of the catalytic metal is lowered at the rate of temperature decrease while the temperature of the catalytic metal is in a region having a temperature lower than the heating temperature and higher than (the heating temperature—100° C., the region serving as the intermediate-temperature region, and the second requirement in which the temperature of the catalytic metal is lowered in such a manner that the length of time that the temperature of the catalytic metal is in the region having a temperature lower than the heating temperature and higher than (the heating temperature—100° C. is within 50 minutes.

6. The method for producing a catalytic metal layer according to claim 5,
   wherein in the step (b), the temperature of the catalytic metal is raised to the heating temperature and then is maintained at the heating temperature for 5 minutes or more.

7. The method for producing a catalytic metal layer according to claim 1,
   wherein in the step (a), the film composed of the catalytic metal is formed so as to have a shape capable of being drawn in one stroke.

8. The method for producing a catalytic metal layer according to claim 1,
   wherein in the step (a), the film composed of the catalytic metal is formed in such a manner that a portion of the film of the catalytic metal is juxtaposed to another portion of the film of the catalytic metal via a part free from the catalytic metal.

9. A method for producing a graphene material, comprising the steps of:
   (e) growing graphene by supplying a carbon source to a surface of the catalytic metal layer formed on the substrate, the catalytic metal layer being formed by the method for producing a catalytic metal layer according to claim 1; and
   (f) separating the graphene serving as a graphene material from the catalytic metal layer.

10. The method for producing a graphene material according to claim 9,
    wherein in the step (a), the film composed of the catalytic metal is formed so as to have a zigzag shape, a spiral shape, or a helical shape, the shape being capable of being drawn in one stroke, and
    in the step (f), after the graphene having a zigzag shape, a spiral shape, or a helical shape is separated from the catalytic metal layer, the graphene material having a linear shape is formed by holding both ends of the graphene and stretching the graphene.

11. A method for producing a graphene material, comprising a step of:
    (e) forming a graphene material by supplying a carbon source to a surface of the catalytic metal layer formed on the substrate to grow graphene, the catalytic metal layer being formed by the method for producing a catalytic metal layer according to claim 1,
    wherein in the step (a), the film composed of the catalytic metal is formed so as to have a desired shape, and
    in the step (e), the graphene material having the desired shape is formed.

12. A method for producing a catalytic metal layer, comprising the steps of:
    (a) forming a film composed of nickel on a sapphire substrate, the nickel serving as a catalytic metal having the function of promoting graphenization;
    (b) raising the temperature of the catalytic metal to a heating temperature of 900° C. or higher and 1400° C. or lower;
    (c) lowering the temperature of the catalytic metal from the heating temperature to a temperature of (the heating temperature—100° C. or lower, and lowering the temperature of the catalytic metal so as to satisfy at least one of a first requirement in which the temperature of the catalytic metal is lowered at a rate of temperature decrease of 2° C./min or more while the temperature of the catalytic metal is lower than the heating temperature and higher than (the heating temperature—100° C., and a second requirement in which the temperature of the catalytic metal is lowered in such a manner that the length of time that the temperature of the catalytic metal is in a region having a temperature lower than the heating temperature and higher than (the heating temperature—100° C. is within 50 minutes; and
    (d) crystallizing the catalytic metal into a catalytic metal layer while the temperature of the catalytic metal is (the heating temperature—100° C. or lower.

13. The method for producing a catalytic metal layer according to claim 12,
    wherein in the step (c), the rate of temperature decrease is 3° C./min or more and 20° C./min or less.

14. The method for producing a catalytic metal layer according to claim 12,
    wherein in the step (a), the film composed of the catalytic metal is formed so as to have a shape capable of being drawn in one stroke.

15. The method for producing a catalytic metal layer according to claim 12,
    wherein in the step (a), the film composed of the catalytic metal is formed in such a manner that a portion of the film of the catalytic metal is juxtaposed to another portion of the film of the catalytic metal via a part free from the catalytic metal.

16. A method for producing a graphene material, comprising the steps of:
    (e) growing graphene by supplying a carbon source to a surface of the catalytic metal layer formed on the substrate, the catalytic metal layer being formed by the method for producing a catalytic metal layer according to claim 7; and
    (f) separating the graphene serving as a graphene material from the catalytic metal layer.

17. The method for producing a graphene material according to claim 16,
    wherein in the step (a), the film composed of the catalytic metal is formed so as to have a zigzag shape, a spiral shape, or a helical shape, the shape being capable of being drawn in one stroke, and
    in the step (f), after the graphene having a zigzag shape, a spiral shape, or a helical shape is separated from the catalytic metal layer, the graphene material having a linear shape is formed by holding both ends of the graphene and stretching the graphene.

18. A method for producing a graphene material, comprising a step of:
    (e) forming a graphene material by supplying a carbon source to a surface of the catalytic metal layer formed on the substrate to grow graphene, the catalytic metal layer being formed by the method for producing a catalytic metal layer according to claim 7,
    wherein in the step (a), the film composed of the catalytic metal is formed so as to have a desired shape, and
    in the step (e), the graphene material having the desired shape is formed.

* * * * *